(12) United States Patent  
Robinson et al.

(10) Patent No.: US 11,624,944 B2  
(45) Date of Patent: Apr. 11, 2023

(54) BACKLIGHT FOR SWITCHABLE DIRECTIONAL DISPLAY

(71) Applicant: RealD Spark, LLC, Beverly Hills, CA (US)

(72) Inventors: Michael G Robinson, Boulder, CO (US); Graham J Woodgate, Henley-on-Thames (GB); Jonathan Harrold, Leamington Spa (GB)

(73) Assignee: RealD Spark, LLC, Beverly Hills, CA (US)

( * ) Notice: Subject to any disclaimer, the term of this patent is extended or adjusted under 35 U.S.C. 154(b) by 114 days.

(21) Appl. No.: 17/387,056

(22) Filed: Jul. 28, 2021

(65) Prior Publication Data

US 2022/0035187 A1 Feb. 3, 2022

Related U.S. Application Data

(60) Provisional application No. 63/112,821, filed on Nov. 12, 2020, provisional application No. 63/058,308, filed on Jul. 29, 2020.

(51) Int. Cl.
*G02F 1/13* (2006.01)
*G02B 27/30* (2006.01)
(Continued)

(52) U.S. Cl.
CPC ......... *G02F 1/1323* (2013.01); *G02B 6/0053* (2013.01); *G02B 27/30* (2013.01);
(Continued)

(58) Field of Classification Search
CPC ............. G02F 1/1323; G02F 1/133607; B60K 2370/347; G02B 5/045; G02B 6/0036;
(Continued)

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

CN-201980020303.0—Notification of the First Office Action dated Dec. 16, 2021.
(Continued)

*Primary Examiner* — Alexander P Gross
(74) *Attorney, Agent, or Firm* — Penny L. Lowry

(57) ABSTRACT

A switchable backlight for a switchable privacy display apparatus comprises a collimated waveguide and an optical turning film comprising first and second arrays of elongate prismatic elements. High image luminance and image visibility is provided for off-axis viewers in a public mode of operation while in a privacy mode of operation visual security level above a perceived privacy threshold may be achieved for off-axis snoopers.

38 Claims, 26 Drawing Sheets

(51) Int. Cl.
  *G02F 1/1335* (2006.01)
  *F21V 8/00* (2006.01)
  *G02B 5/04* (2006.01)
(52) U.S. Cl.
  CPC .......... *G02F 1/133607* (2021.01); *B60K 2370/1523* (2019.05); *B60K 2370/336* (2019.05); *B60K 2370/347* (2019.05); *G02B 5/045* (2013.01)
(58) Field of Classification Search
  CPC . G02B 2207/123; G02B 30/33; G02B 6/0053
  See application file for complete search history.

(56) References Cited

U.S. PATENT DOCUMENTS

| | | |
|---|---|---|
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,935,714 B2 | 3/2021 | Woodgate et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,099,448 B2 | 8/2021 | Woodgate et al. |
| 11,237,417 B2 | 2/2022 | Woodgate et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |

(56) References Cited

U.S. PATENT DOCUMENTS

| | | |
|---|---|---|
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1* | 1/2009 | Chuang ............... G02B 5/045 359/431 |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1* | 7/2010 | Hsu ..................... G02B 5/045 264/2.7 |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1* | 1/2012 | Chang ............... G02F 1/133606 362/235 |
| 2012/0086875 A1 | 4/2012 | Yokota |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1* | 7/2012 | Fan ..................... G02B 30/33 362/613 |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1* | 4/2014 | Nakahara ............ G09G 3/3406 349/61 |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Wook Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1* | 3/2017 | Choi ..................... G02B 30/27 |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |

(56) References Cited

U.S. PATENT DOCUMENTS

| | | |
|---|---|---|
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101454712 A | 6/2009 |
| CN | 101518095 A | 8/2009 |
| CN | 101681061 A | 3/2010 |
| CN | 103473494 A | 12/2013 |
| CN | 103688211 A | 3/2014 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 105842909 A | 8/2016 |
| CN | 106104372 A | 11/2016 |
| CN | 106415342 A | 2/2017 |
| CN | 209171779 U | 7/2019 |
| EP | 2037318 A1 | 3/2009 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H11174489 A | 7/1999 |
| JP | 2005316470 A | 11/2005 |
| JP | 2005345799 A | 12/2005 |
| JP | 2006139160 A | 6/2006 |
| JP | 2007501966 A | 2/2007 |
| JP | 2007148279 A | 6/2007 |
| JP | 2007273288 A | 10/2007 |
| JP | 2009020293 A | 1/2009 |
| JP | 2014099363 A | 5/2014 |
| KR | 20120011228 A | 2/2012 |
| KR | 1020170040565 A | 4/2017 |
| KR | 101990286 B1 | 6/2019 |
| TW | M537663 U | 3/2017 |
| TW | 001612360 | 1/2018 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2017117570 A1 | 7/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

CN201680061632.6 Notification of the First Office Action dated Sep. 14, 2021.

CN201880073578.6 Notification of the First Office Action dated Aug. 27, 2021.

EP-19743619.9 Extended European Search of European Patent Office dated Nov. 23, 2021.

EP-19743701.5 Extended European Search Report of European Patent Office dated Nov. 24, 2021.

EP19771688.9 Extended European Search Report of European Patent Office dated Dec. 2, 2021.

PCT/US2021/043435 International search report and written opinion of the international searching authority dated Nov. 1, 2021.

PCT/US2021/043444 International search report and written opinion of the international searching authority dated Nov. 1, 2021.

EP-20754927.0 Extended European Search Report of European Patent Office dated Sep. 19, 2022.

Adachi, et al. "P-228L: Late-News Poster: Controllable Viewing-Angle Displays using a Hybrid Aligned Nematic Liquid Crystal Cell", ISSN, SID 2006 Digest, pp. 705-708.

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

Cheng, et al., "Fast-Response Liquid Crystal Variable Optical Retarder and Multilevel Attenuator," Optical Engineering 52 (10), 107105 (Oct. 16, 2013). (Year: 2013).

CN201780030715.3 Notification of the First Office Action dated Jan. 21, 2020.

CN201880042320.X Notification of the First Office Action dated May 25, 2021.

EP-16860628.3 Extended European Search Report of European Patent Office dated Apr. 26, 2019.

EP-17799963.8 Extended European Search Report of European Patent Office dated Oct. 9, 2019.

(56) References Cited

OTHER PUBLICATIONS

EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books LTD, London, 1970.
TW107132221 First Office Action dated Apr. 28, 2022.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
CN-201880042320.X Notification of the Third Office Action from the Chinese Patent Office dated Dec. 30, 2022.
CN-201980082757.0 Notification of the 1st Office Action of the Chinese Patent Office dated Dec. 5, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
PCT/US2022/045030 International search report and written opinion of the international searching authority dated Jan. 3, 2023.

\* cited by examiner

BACKLIGHT FOR SWITCHABLE DIRECTIONAL DISPLAY

TECHNICAL FIELD

This disclosure generally relates to illumination from light modulation devices, and more specifically relates to control of privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

In a known privacy display the privacy mode is provided by the addition of a removable louver film, such as marketed by 3M Corporation, which may not be reliably or easily fitted or removed by users and therefore in practice, is not assiduously attached by the user every time they are outside the office. In another known privacy display the control of privacy mode is electronically activated but control is vested in the user who must execute a keystroke to enter privacy mode.

BRIEF SUMMARY

According to a first aspect of the present disclosure, there is provided an illumination apparatus comprising: a waveguide extending across a plane and comprising: first and second opposed light guiding surfaces arranged to guide light along the waveguide, the second light guiding surface being arranged to guide light by total internal reflection, and an input end arranged between the first and second light guiding surfaces and extending in a lateral direction between the first and second light guiding surfaces; at least one light source arranged to input light into the waveguide through the input end, wherein the waveguide is arranged to cause light from the light sources to exit from the waveguide through the second light guiding surface by breaking total internal reflection; and an optical turning film component comprising: an input surface arranged to receive the light exiting from the waveguide, the input surface extending across the plane; and an output surface facing the input surface, wherein the input surface comprises: a first array of prismatic elements each comprising a pair of facets defining a ridge therebetween, the ridges extending along a first array of lines across the plane in which the input surface extends; and a second array of prismatic elements each comprising a pair of facets defining a ridge therebetween, the ridges extending along a second array of lines across the plane in which the input surface extends, the first array of lines and the second array of lines extending at different angles projected on to the plane so that the first array of prismatic elements and the second array of prismatic elements deflect the light exiting from the waveguide into different lobes. Advantageously illumination may be provided with high efficiency around two different polar directions.

The first array of lines may have a first arithmetic mean tangential angle projected on to the plane and the second array of lines may have a second arithmetic mean tangential angle projected on to the plane, the second arithmetic mean tangential angle may be greater than the first arithmetic mean tangential angle. Advantageously the turning film may provide different lobes from a common waveguide.

The first array of lines may have an average tangential angle projected on to the plane of 0° from the lateral direction. The first and second arrays of lines may each have tangential angles projected on to the plane of not more than 55° from the lateral direction. The optical turning film component may have a rectangular shape across the plane and the lateral direction may be along a major or minor axis of the rectangular shape. Advantageously one of the lobes may be provided at or near to the normal to the illumination apparatus and a second lobe may be provided away from the optical axis.

The first array of lines may be straight. The second array of lines may be straight. The output of the illumination apparatus may be provided with a common lobe direction for regions across the illumination apparatus for either of the first or second lobes. The far field illumination pattern may have a reduced angular width, advantageously achieving increased far field lobe fidelity.

The first array of lines may be curved. The second array of lines may be curved. A common optical window may be provided for regions across the illumination apparatus, advantageously achieving increased uniformity across the illumination apparatus. In a display, the display uniformity may be increased.

Facet angles of respective facets, defined between a normal to the facet and a normal to the plane, are between 40° and 70° and preferably between 47.5° and 62.5°. Advantageously the output from the collimated waveguide may be directed in polar directions around the normal to the illumination apparatus.

In at least one of the first and second arrays of prismatic elements, the facets on opposite sides of the ridge may have facet angles defined between a normal to the facet and a normal to the plane across which the input surface extends that may be different. Advantageously different lobes may be provided for light input at opposite ends of the waveguide.

The output surface may be planar. Advantageously cost and complexity may be reduced.

The at least one light source comprises an array of light sources. Advantageously redundancy may be provided for the light source, increasing lifetime.

The waveguide further comprises a second input end arranged between the first and second light guiding surfaces opposite to the first mentioned input end. The illumination apparatus may further comprise at least one first light source arranged to input light into the waveguide through the first input end and at least one second light source arranged to input light into the waveguide through the second input end. First and second sets of lobes may be provided with different polar distributions of luminance and/or luminous intensity.

The illumination apparatus may further comprise a control system arranged to control the at least one first light source and the at least one second light source independently. Advantageously different illumination profiles may be achieved.

The waveguide may be arranged to cause light from the at least one first light source and the at least one second light source to exit from the waveguide with different angular distributions. The different lobes may have solid angles profiles that are different for light from respective first and second light sources. Advantageously the illumination apparatus may be switched between different polar distributions, each with different lobes.

The waveguide may be arranged to cause light from the at least one first light source and the at least one second light source to exit from the waveguide with a common angular distribution. The different lobes may have solid angles profiles that are the same for light from respective first and second light sources but with different directions. Advantageously the illumination apparatus may be switched between different polar directions, each with different lobes of substantially the same size.

The illumination apparatus may comprise: at least one first light source arranged to provide input light; at least one second light source arranged to provide input light in an opposite direction from the at least one first light source; a waveguide arrangement arranged to receive the input light from the at least one first light source and the at least one second light source and to cause light from the at least one first light source and the at least one second light source to exit from the waveguide arrangement by breaking total internal reflection, wherein the waveguide arrangement comprises at least one waveguide; and an optical turning film component comprising: an input surface arranged to receive the light exiting from a waveguide through a light guiding surface of the waveguide by breaking total internal reflection, the input surface extending across the plane; and an output surface facing the input surface, wherein the input surface comprises: a first array of prismatic elements each comprising a pair of facets defining a ridge therebetween, the ridges extending along a first array of lines across the plane in which the input surface extends; and a second array of prismatic elements each comprising a pair of facets defining a ridge therebetween, the ridges extending along a second array of lines across the plane in which the input surface extends, the first array of lines and the second array of lines extending at different angles projected on to the plane so that the first array of prismatic elements and the second array of prismatic elements deflect the light exiting from the waveguide into different lobes.

The waveguide arrangement may comprise: a waveguide extending across a plane and comprising: first and second opposed light guiding surfaces arranged to guide light along the optical waveguide, the second light guiding surface being arranged to guide light by total internal reflection, and first and second input ends arranged between the first and second light guiding surfaces and extending in a lateral direction between the first and second light guiding surfaces; wherein the at least one first light source is arranged to input light into the waveguide through the first input end and the at least one second light source is arranged to input light into the waveguide through the second input end, and the waveguide is arranged to cause light from the at least one first light source and the at least one second light source to exit from the waveguide through one of the first and second light guiding surfaces by breaking total internal reflection. Advantageously thickness and cost may be reduced.

The waveguide arrangement may comprise: a first waveguide extending across a plane and comprising first and second opposed light guiding surfaces arranged to guide light along the optical waveguide, the second light guiding surface being arranged to guide light by total internal reflection; and a first input end arranged between the first and second light guiding surfaces and extending in a lateral direction between the first and second light guiding surfaces; wherein the at least one first light source is arranged to input light into the first waveguide through the first input end, and the first waveguide is arranged to cause light from the at least one first light source to exit from the first waveguide through one of the first and second light guiding surface by breaking total internal reflection; a second waveguide extending across the plane in arranged in series with the first waveguide and comprising first and second opposed light guiding surfaces arranged to guide light along the optical waveguide, the second light guiding surface being arranged to guide light by total internal reflection, and a second input end arranged between the first and second light guiding surfaces and extending in a lateral direction between the first and second light guiding surfaces; wherein the at least one second light source is arranged to input light into the second waveguide through the second input end, and the second waveguide is arranged to cause light from the at least one second light source to exit from the second waveguide through one of the first and second light guiding surfaces by breaking total internal reflection, and wherein the first and second waveguides are oriented so that at least one first light source and at least one second light source input light into the first and second waveguides in opposite directions. Advantageously luminance uniformity may be increased.

According to a second aspect of the present disclosure there is provided a backlight apparatus comprising: an illumination apparatus and a rear reflector arranged to receive light exiting from the first surface of waveguide and direct it back through the waveguide. Advantageously output luminance and/or luminous intensity may be increased.

According to a third aspect of the present disclosure there is provided a display apparatus comprising: a backlight apparatus and a spatial light modulator arranged to receive light from the backlight apparatus. A display with high luminance directed towards at least two different polar directions may be provided. Advantageously display efficiency and brightness may be increased.

The display apparatus may further comprise at least one display polariser arranged on a side of the spatial light modulator; an additional polariser arranged on the same side of the spatial light modulator as the display polariser; and at least one polar control retarder arranged between the display polariser and the additional polariser, the at least one polar control retarder including a switchable liquid crystal retarder comprising a layer of liquid crystal material. Advantageously a privacy display may be provided with high efficiency. The display may be switchable between a privacy mode and a public mode of operation.

According to a fourth aspect of the present disclosure there is provided a vehicle having a display apparatus according to the third aspect mounted therein. The different lobes into which light exiting from the waveguide may be deflected may be lobes directed at locations of two occupants in the vehicle. Advantageously a privacy display may be provided with high security factor for one of the vehicle occupants and high image visibility for another occupant; and the display may be switched to a public mode of operation with high image visibility for multiple occupants.

The different lobes into which light exiting from the waveguide may be deflected may be lobes respectively directed at a location of an occupant in the vehicle and at a location of an internal surface of the vehicle. Advantageously the security factor to the other occupant may be increased. Light that is reflected from the internal surface may be reflected by the display to the other occupant, further increasing security factor in a privacy mode of operation.

According to a fifth aspect of the present disclosure there is provided an optical turning film component comprising: an input surface and for receiving light exiting from a waveguide through a light guiding surface of the waveguide by breaking total internal reflection, the input surface extending across a plane; and an output surface facing the input surface, wherein the input surface comprises: a first array of prismatic elements each comprising a pair of facets defining a ridge therebetween, the ridges extending along a first array of lines across the plane; and a second array of prismatic elements each comprising a pair of facets defining a ridge therebetween, the ridges extending along a second array of lines across the plane, the first array of lines and the second array of lines extending at different angles projected on to the plane so that the first array of prismatic elements and the second array of prismatic elements deflect the light exiting from the waveguide into different lobes. Advantageously a turning film for use in a privacy display including a switchable privacy display may be conveniently tooled at low cost.

Embodiments of the present disclosure may be used in a variety of optical systems. The embodiments may include or work with or in cooperation with a variety of illuminators, environmental lighting, interior and exterior automotive illumination, projectors; projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
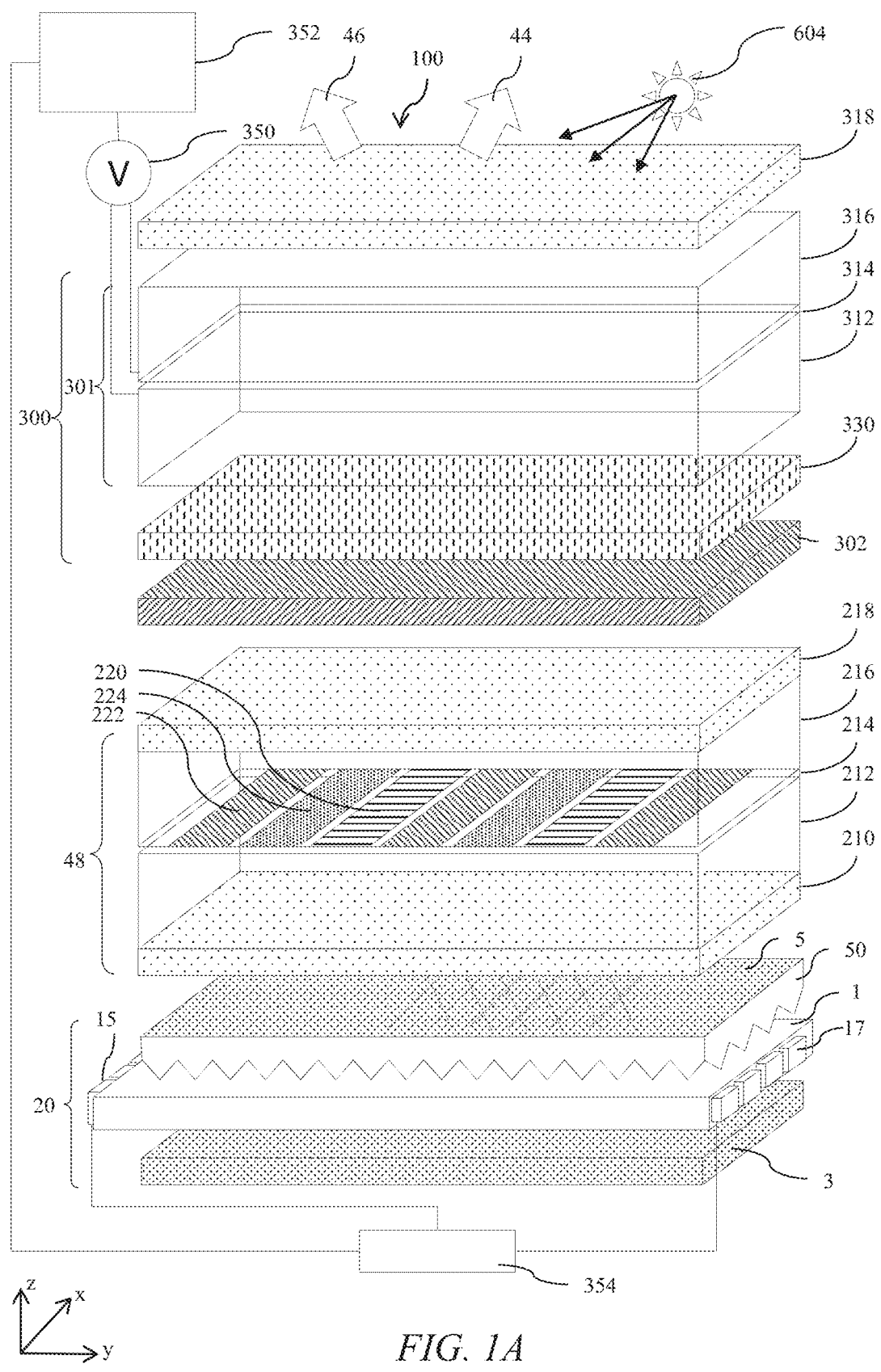
FIG. 1A is a schematic diagram illustrating a front perspective view of a switchable privacy display.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films, Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n$ d where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

Terms related to privacy display appearance will now be described.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL=(Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho/\pi \cdot (C+1)/(P.L))}{(C-1)} \qquad \text{eqn. 7}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL=1+I \cdot \rho/(\pi \cdot P \cdot L) \qquad \text{eqn. 8}$$

The perceptual image security may be determined from the logarithmic response of the eye, such that the security factor, S is given by:

$$S=\log_{10}(V) \qquad \text{eqn. 9}$$

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(q=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In comparison to privacy displays, desirably wide-angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 10}$$

and so:

$$M=((Y+R)-(K+R))/((Y+R)+(K+R))=(Y-K)/(Y+K+2\cdot R) \qquad \text{eqn. 11}$$

Thus the visual security level (VSL), is equivalent (but not identical to) 1/M. In the present discussion, for a given off-axis relative luminance, P the wide-angle image visibility, W is approximated as $$W=1/\text{VSL}=1/(1+I\cdot\rho/(\pi\cdot P\cdot L)) \qquad \text{eqn. 12}$$

In the present discussion the colour variation $\Delta\varepsilon$ of an output colour $(u_w'+\Delta u', v_w'+\Delta v')$ from a desirable white point $(u_w', v_w')$ may be determined by the CIELUV colour difference metric, assuming a typical display spectral illuminant and is given by:

$$\Delta\varepsilon=(\Delta u'^2+\Delta v'^2)^{1/2} \qquad \text{eqn. 13}$$

Catadioptric elements employ both refraction and reflection, which may be total internal reflection or reflection from metallised surfaces.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

A switchable privacy display apparatus will now be described.

FIG. 1A is a schematic diagram illustrating a front view of a privacy display apparatus 200 comprising a privacy display device 100 that is controlled by a privacy control system 350, 352, 354. The display device 100 displays an image.

Display apparatus 100 comprises a backlight apparatus 20; and a spatial light modulator 48 arranged to receive light from the backlight apparatus 20.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the input display polariser 210 and backlight 20 to provide recirculated light and increase display efficiency. Advantageously efficiency may be increased.

The backlight apparatus 20 a waveguide 1, first and second light sources 15, 17, a rear reflector, 3 and optical turning film component 50. Rear reflector 3 is arranged to receive light exiting from the first surface of waveguide 1 and direct it back through the waveguide 1.

Optical stack 5 may comprise diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

Light is output into lobes 440A, 440B as will be described further herein.

Figure 1B:
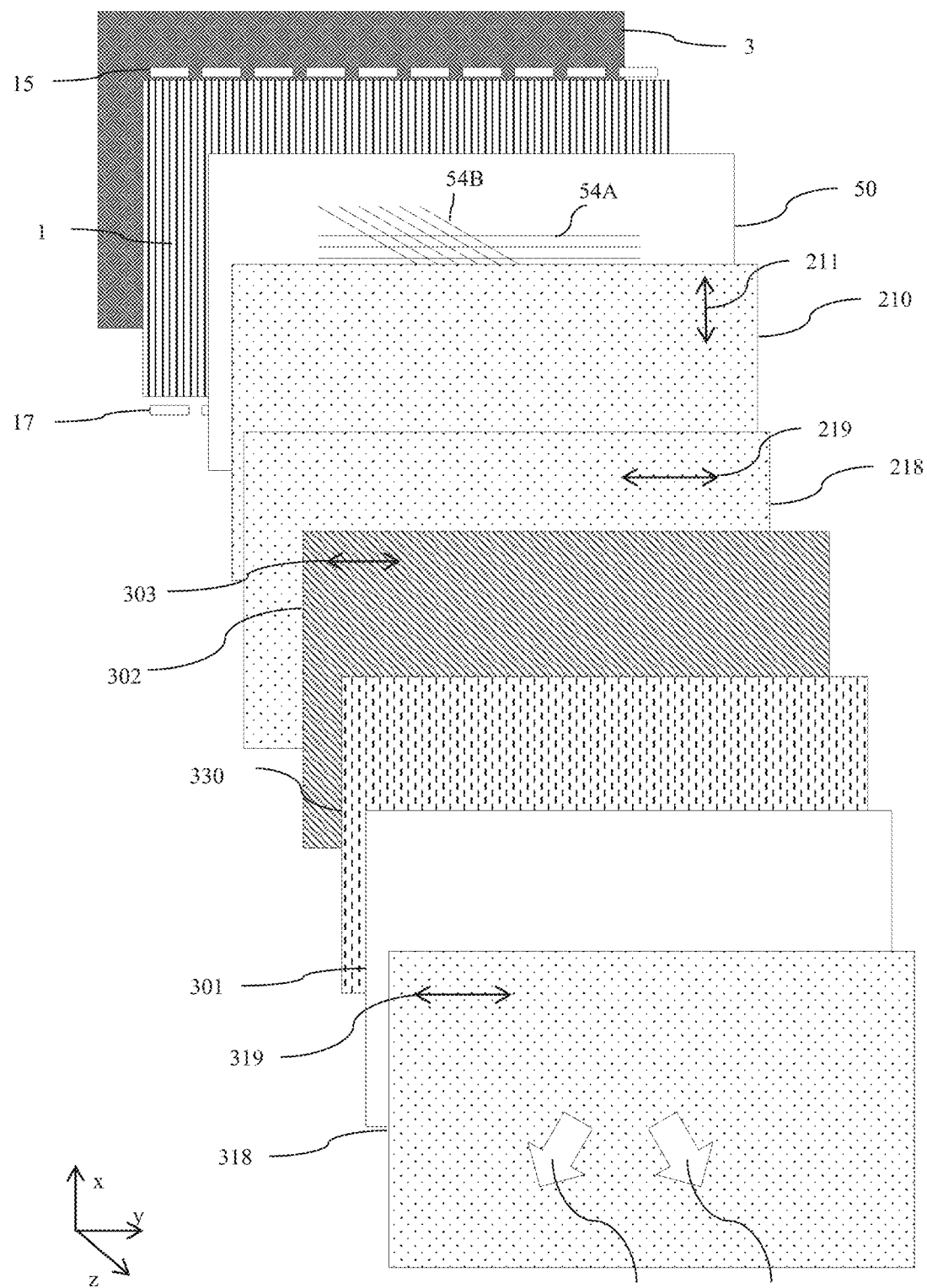
FIG. 1B is a schematic graph illustrating a front perspective view of a stack of optical components in the apparatus of FIG. 1A.

FIG. 1B is a schematic graph illustrating a front perspective view of a stack of some of the optical components in the apparatus of FIG. 1A. Features of the embodiment of FIG. 1B not discussed in further detail may be assumed to correspond to the features with equivalent reference numerals as discussed above, including any potential variations in the features.

The display apparatus 100 comprises: input display polariser 210 and output display polariser 218 arranged on the output side of the spatial light modulator 48; an additional polariser 318 arranged on the same side of the spatial light modulator as the display polariser 218; and at least one polar control retarder 300 arranged between the display polariser 218 and the additional polariser 318. Polarisers 210, 218, 318 may be absorbing dichroic polarisers.

The display polariser 218 and the additional polariser 318 have electric vector transmission directions 219, 319 that are parallel, and orthogonal to the input polariser 210 transmission direction 211. Reflective polariser 302 further has a polarisation transmission direction 303 that is aligned parallel to the polarisation transmission directions 219, 319.

In FIG. 1A, additional polariser 318 is arranged on the same side of the spatial light modulator 48 as the display output polariser 218. Alternatively (not shown) the additional polariser 318 may be arranged on the same side as the input polariser 210 and polar control retarder 300 may be arranged between additional polariser 318 and input polariser 210. Alternatively (not shown) plural polar control retarders and plural additional polarisers may be provided on the input side of the spatial light modulator 48. Alternatively (not shown) plural polar control retarders may be provided on the input and output sides of the spatial light modulator 48.

Polar control retarders 300 comprise: (i) a switchable liquid crystal retarder 301 comprising a layer 314 of liquid crystal material arranged between transparent support substrates 312, 316 and arranged between the display polariser 218 and the additional polariser 318; and (ii) at least one passive compensation retarder 330.

FIG. 1A further illustrates a reflective polariser 302 that is arranged between the output polariser 218 and the polar control retarder 300. The operation of polar control retarders 300 arranged between polariser 218, 302, 318 will be described hereinbelow with respect to FIG. 22A to FIG. 23D.

Control of the polar control retarders is achieved by means of driver 350 to change the operating voltage across the liquid crystal layer 314. Controller 352 is provided to control the driver 350 and controller 354 that further controls the driving of light sources 15, 17.

The display device 100 is arranged to display an image and capable of operating in at least a public mode and a privacy mode, wherein in the privacy mode the privacy function is provided and the visibility of the image to an off-axis viewer is reduced compared to the public mode and the visibility of the image to the primary user in an on-axis position remains visible in both the privacy and public modes. The control system 350, 352, 354 selectively operates the display device 100 in the public mode or the privacy mode for at least one region of the displayed image, typically the entire displayed image.

Figure 2:
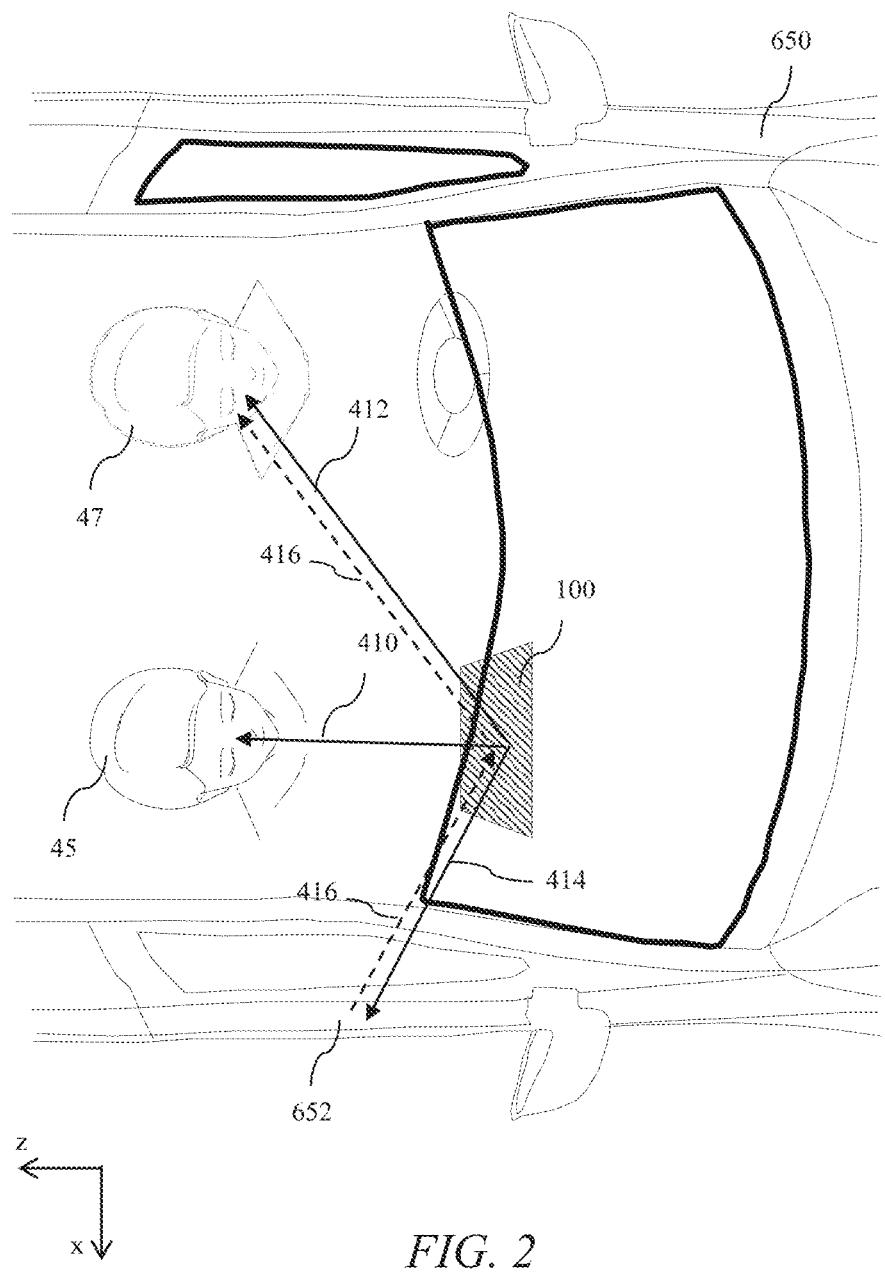
FIG. 2 is a schematic diagram illustrating a top view of a privacy display in an automotive vehicle.

FIG. 2 is a schematic diagram illustrating a top view of a privacy display in an automotive vehicle 650 that has a mounted display apparatus 100 of the present embodiments. Features of the embodiment of FIG. 2 not discussed in further detail may be assumed to correspond to the features with equivalent reference numerals as discussed above, including any potential variations in the features.

In some embodiments of the present disclosure different lobes have directions 410, 412 of peak luminance into which light exiting from the waveguide 1 is deflected, the formation of which will be described hereinbelow. The lobes 410, 412 are directed at locations of two occupants 45, 47 in the vehicle 650.

In some embodiments of the present disclosure different lobes have directions 410, 414 of peak luminance into which light exiting from the waveguide 1 is deflected, the formation of which will be described hereinbelow. The lobes 410, 414 into which light exiting from the waveguide 1 is deflected are lobes respectively directed at a location of an occupant 45 in the vehicle and at a location of an internal panel 652 of the vehicle 650.

The structure and operation of illumination apparatus will now be described.

Figure 3A:
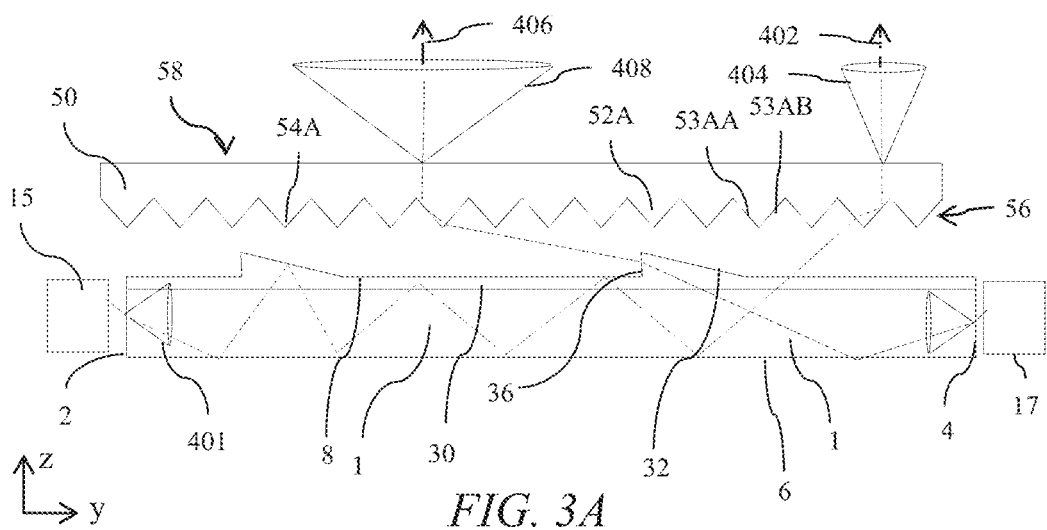
FIG. 3A is a schematic diagram illustrating a side view of a switchable illumination apparatus with different solid angles in first and second lobe directions.
Figure 3B:
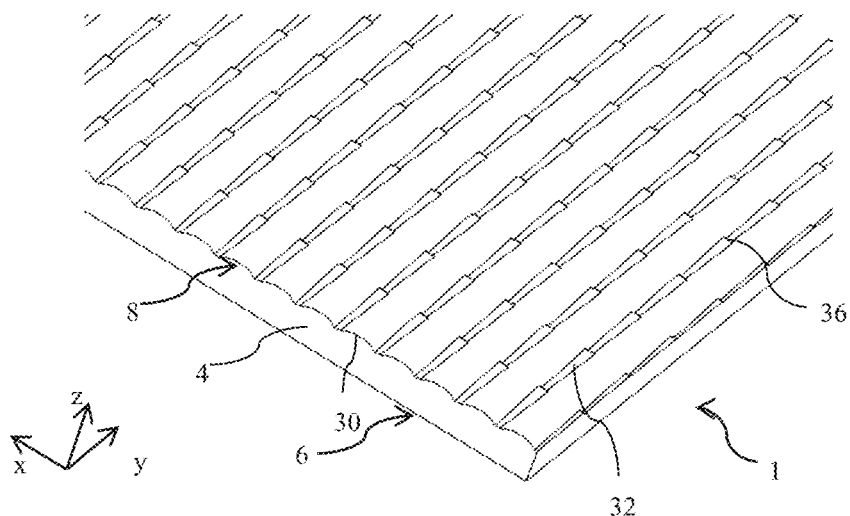
FIG. 3B is a schematic diagram illustrating a top perspective view of a collimating waveguide comprising lenticular and stepped prismatic surfaces arranged on the same side of a waveguide arranged to provide different solid angles of output for light input at first and second input sides.

FIG. 3A is a schematic diagram illustrating a side view of a switchable illumination apparatus; and FIG. 3B is a schematic diagram illustrating a top perspective view of a collimating waveguide 1 comprising lenticular microstructure 30 and stepped prismatic surfaces 32, 36 arranged on the same side of a waveguide 1 arranged to provide different solid angles of output for light input at first and second input sides 2, 4.

Waveguide 1 is an optical waveguide extending across a plane (x-y plane in FIG. 3A) that comprises first and second opposed light guiding surfaces 6, 8 arranged to guide light rays 402, 406 along the waveguide 1. The first and second light guiding surfaces 6, 8 are arranged to guide light by total internal reflection. In the embodiment of FIG. 3A, the surface 6 is planar and the surface 8 comprises optical microstructures as will be described further with regards to the illustrative embodiment of FIG. 3B.

Waveguide 1 comprises an input end 2 arranged between the first and second light guiding surfaces 6, 8 and extending in a lateral direction (along the x-axis) between the first and second light guiding surfaces 6, 8.

At least one light source 15 is arranged to input light into the waveguide through the input end 2. Light source may comprise an array of light sources, such as an LED array.

The waveguide 1 is arranged to cause light from the light sources 15 to exit from the waveguide 1 through the second light guiding surface 8 by breaking total internal reflection. That is incident rays 402 on the surface 8 have angles of incidence at the surface 8 that are less than the critical angle at the said surface 8.

The illumination apparatus further comprises an optical turning film component 50 that comprises an input surface 56 arranged to receive the light rays 402 exiting from the waveguide 1, the input surface 56 extending across a plane. The turning film component 50 further comprises an output surface 58 facing the input surface 56. In the embodiment of FIG. 3A the output surface 58 is planar. In alternative embodiments the output surface may comprise optical structures such as diffusers. Advantageously the size of the light lobes 404, 408 may be adjusted and uniformity of output across the illumination apparatus may be increased.

The input surface 56 comprises: a first array of prismatic elements 52A each comprising a pair of facets 53AA, 53AB defining a ridge 54A therebetween. The ridges 54A extend along a first array of lines across the plane in which the input surface 56 extends.

The illumination apparatus further comprises at least one light source 15 arranged to input light 402 into the waveguide 1 through the input end 2. In operation light rays 402 from light source 15 are input into the waveguide 1 through the input end 2. For a planar input side 2, light ray 402 within the waveguide 1 at the input end 2 is in a light cone 401 that is determined by the critical angle at the input side. In comparison to the present embodiments if surfaces 6,8 were to comprise planar surfaces no light leakage from the waveguide 1 would take place.

In the present embodiment surface 8 comprises microstructures that spread the input light cone so that some light leaks through the surface 8 at locations along the waveguide 1. Such microstructures may comprise sloped microprism surfaces 32 and elongate lenticular or prismatic surfaces 30.

Light rays exiting the waveguide 1 close to the critical angle inside the waveguide 1 and are near grazing incidence with the surface 8 and have a narrow output cone angle. Light ray 402 is incident on facet 53AA at which it is refracted and then reflected by TIR at surface 53AB to be deflected in the normal direction. Output light lobe 404 has a nominal direction of peak luminance and solid angle of output with full width half maximum (FWHM) in a given plane that is determined by the extraction microstructures 30, 32 of the waveguide 1 and the surface normal directions of the facets 43AA, 53AB.

In the embodiment of FIG. 3A, the waveguide further comprises a second input end 4 arranged between the first and second light guiding surfaces 6, 8 opposite to the first mentioned input end. At least one second light source 17 is arranged to input light ray 406 into the waveguide 1 through the second input end 4.

The waveguide 1 is arranged to cause light from the at least one first light source 15 and the at least one second light source 17 to exit from the waveguide 1 with different angular distributions of lobes 404, 408. In comparison to the light ray 402, the light ray 406 is output through facets 36 of the microstructures. Facets 36 are substantially not seen by the light rays 402 whereas facets 36 have for example a surface normal parallel to the plane of surface 8 provide an output cone 408 that is substantially greater solid angle than the cone 404. Light rays in cone 408 are incident on the turning film component 50 and are extracted by refraction at facets 53AB and reflected by total internal reflection at facets 53AA of the prisms 52A. Thus the lobe that is determined by the ray 406 and cone 408 may be different to the lobe determined by the ray 402 and cone 404. The direction of the respective lobes may be arranged by adjustment of the microstructures 30, 32, 36 and the prisms 52A of the turning film component 50.

Referring again to FIG. 1A, the control system 352, 354 is arranged to control the at least one first light source 15 and the at least one second light source 17 independently. Advantageously controllable illumination into lobes 404, 408 may be provided to achieve a switchable directionality illumination apparatus.

In an alternative embodiment the first surface 6 of the waveguide 1 may be arranged between the second surface 8 and the turning film component 50. Light output may be achieved through both of the surfaces 6,8 as will be further described below.

One example of an alternative waveguide 1 will now be described.

Figure 3C:
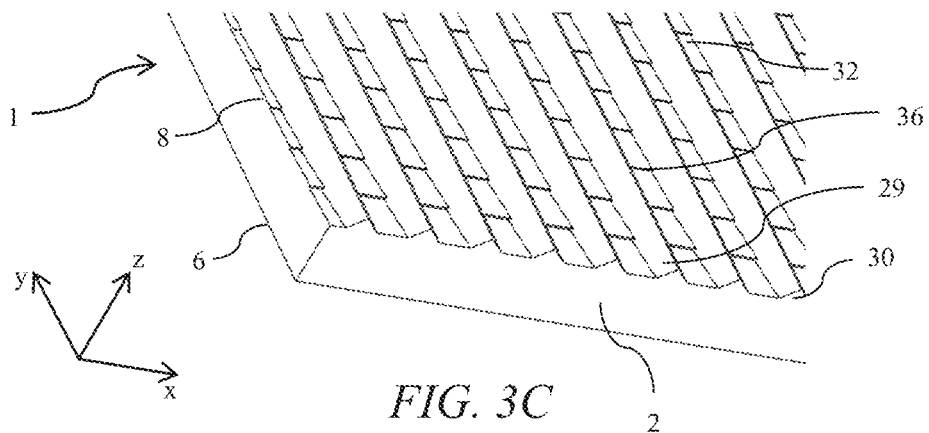
FIG. 3C is a schematic diagram illustrating a top perspective view of a collimating waveguide comprising linear prismatic and stepped prismatic surfaces arranged on the same side of a waveguide arranged to provide different solid angles of output for light input at first and second input sides.

FIG. 3C is a schematic diagram illustrating a top perspective view of a waveguide 1 comprising linear prismatic features 29 and stepped prismatic features 32, 36 arranged on the same side of a waveguide 1 and arranged to provide different solid angles of output for light input at first and second input ends 2, 4.

In operation, the rays 404, 408 may propagate in a similar manner to that illustrated in FIG. 3A. In the arrangement of FIG. 3C, the prismatic features 29 have a higher average facet tilt angle compared to the lenticular features 30 of FIG. 3B. More waveguiding light may be leaked into angles close to the critical angle at the surface 8, and advantageously increased output coupling efficiency along the waveguide 1 may be achieved.

Features of the embodiment of FIGS. 3A-C not discussed in further detail may be assumed to correspond to the features with equivalent reference numerals as discussed above, including any potential variations in the features The operation of the illumination apparatus similar to that of FIG. 3A in a backlight 20 will now be described.

Figure 4A:
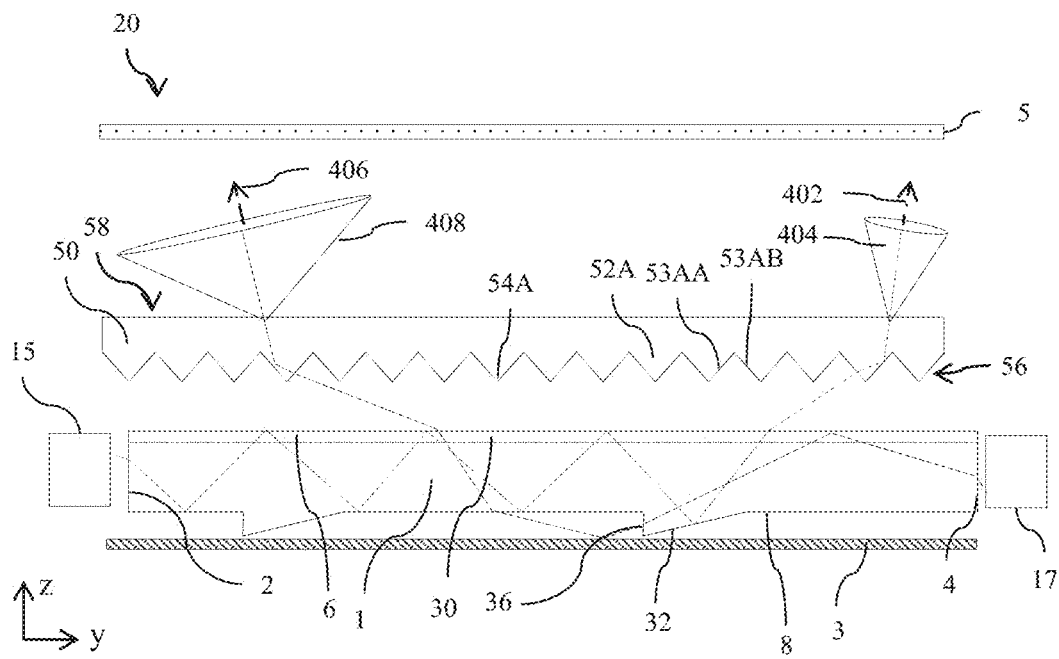
FIG. 4A is a schematic diagram illustrating a side view of a switchable backlight further comprising a rear reflector and with different solid angles in first and second lobe directions.
Figure 4B:
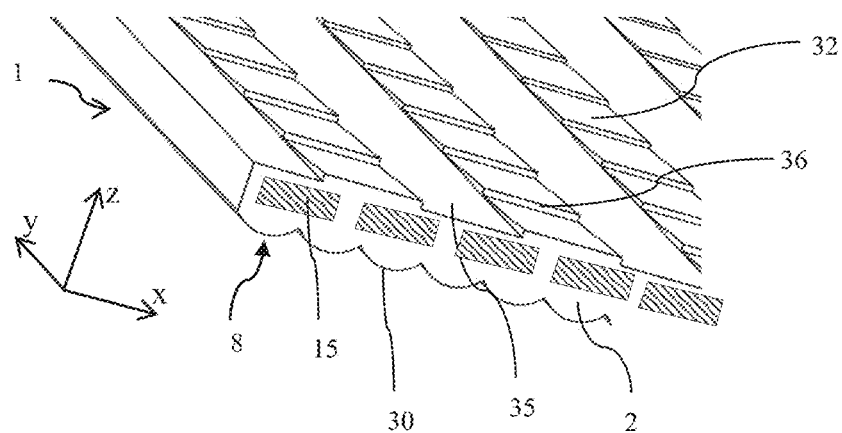
FIG. 4B is a schematic diagram illustrating a top perspective view of a collimating waveguide comprising lenticular and stepped prismatic surfaces arranged on opposite sides of a waveguide arranged to provide different solid angles of output for light input at first and second input sides.

FIG. 4A is a schematic diagram illustrating a side view of a switchable backlight 20 further comprising rear reflector 3 and diffuser 5; and FIG. 4B is a schematic diagram illustrating a top perspective view of a collimating waveguide 1 comprising lenticular microstructure 30 and stepped prismatic surfaces 32, 36 arranged on opposite sides of a waveguide 1 arranged to provide different solid angles of output for light input at first and second input sides 2, 4.

FIGS. 4A-B differ from FIGS. 3A-B in several aspects. First, a reflector 3 is arranged to receive light that is output through the second surface 8 of the waveguide 1. In operation light rays 402, 406 may leak through both surfaces 6, 8. Light rays that leak through the first surface 6 are output directly to the turning film component 50 whereas light rays that leak through the second surface 8 are reflected by the rear reflector 3 and pass back through the waveguide 1. Advantageously output efficiency is increased. Such rear reflector may be used with the illumination apparatus of FIG. 4A as well as the backlight apparatus 20 of FIG. 4B to increase output efficiency.

Further, the lenticular microstructure 30 is arranged on the first surface 6 of the waveguide 1 and the prism microstructures 32, 36 is arranged on the second surface 8 of the waveguide 1. Advantageously a less complex tool may be provided to achieve the microstructures 30, 32, 36.

Further the prismatic structures 32, 36 are arranged between the waveguide 1 and the rear reflector 3. Advantageously damage due to vibration and applied shear forces may achieve reduced damage to the features such as ridges 54A of the turning film component 50.

Features of the embodiment of FIGS. 4A-B not discussed in further detail may be assumed to correspond to the features with equivalent reference numerals as discussed above, including any potential variations in the features The structure and operation of the turning film component 50 will now be described.

Figure 5A:
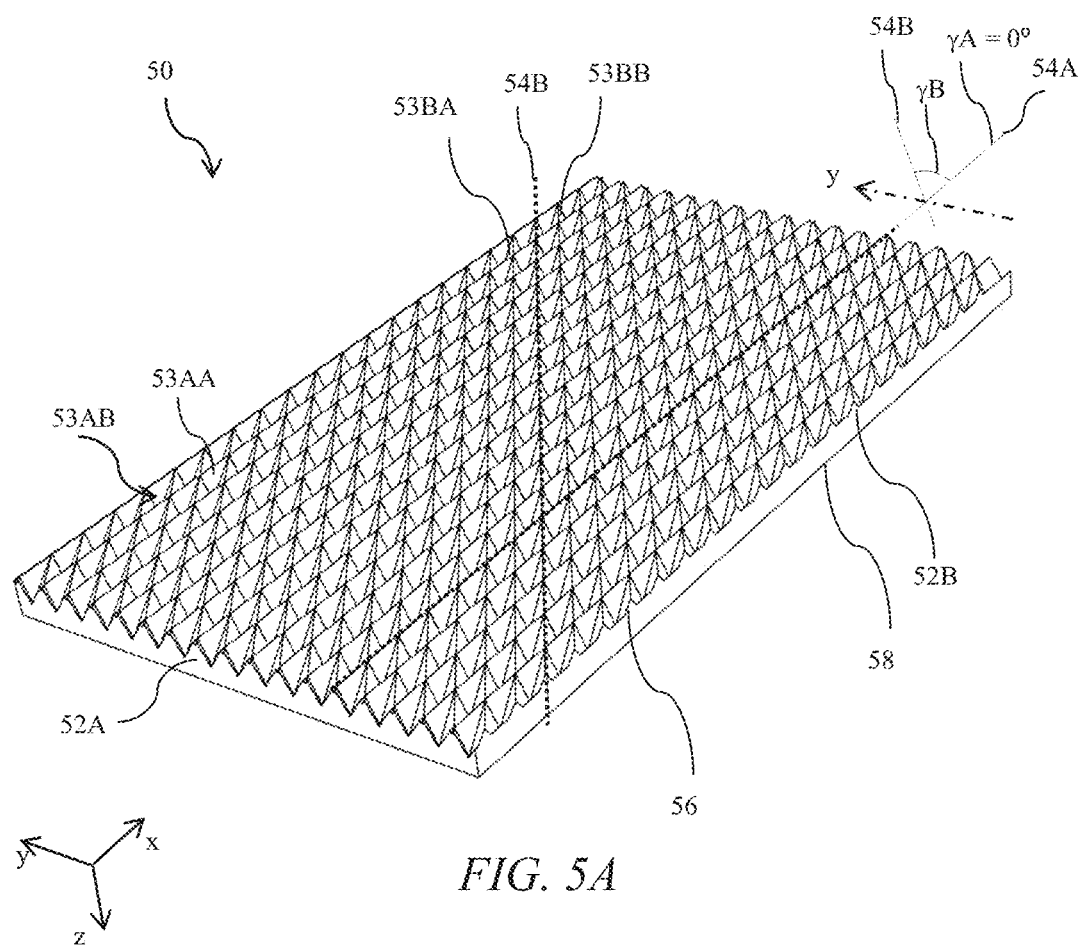
FIG. 5A is a schematic diagram illustrating a side perspective view of a turning film comprising first and second arrays of elongate straight prismatic elements.
Figure 5B:
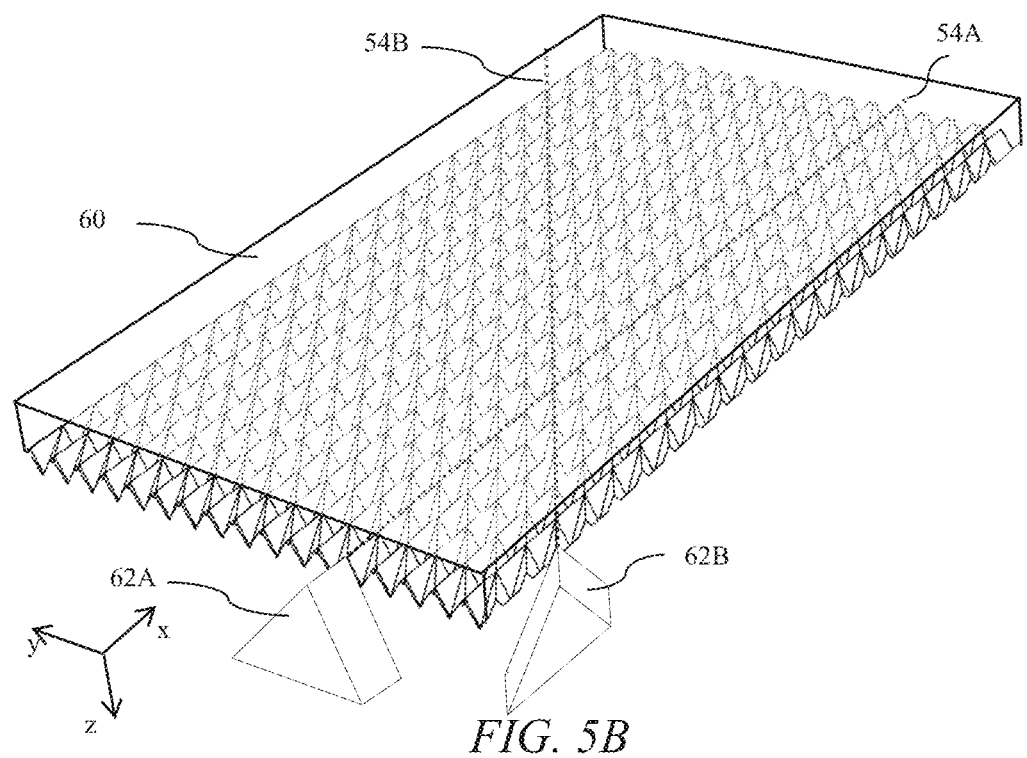
FIG. 5B is a schematic diagram illustrating a side perspective view of the arrangement of cutting tools to achieve a turning film comprising first and second arrays of elongate prismatic elements.

FIG. 5A is a schematic diagram illustrating a side perspective view of a turning film component 50 comprising first and second arrays of elongate straight prismatic elements 52A, 52B; and FIG. 5B is a schematic diagram illustrating a side perspective view of the arrangement of cutting tools to achieve a turning film comprising first and second arrays of elongate prismatic elements.

The optical turning film component 50 has a rectangular shape across the plane and the lateral direction is along a major or minor axis of the rectangular shape.

The first array of lines of ridges 54A have an angle γA projected on to the plane in which the input surface 56 extends. The second array of lines of ridges 54B have a second angle γB projected on to the plane, the second angle γB being greater than the first angle γA. The first array of lines of ridges 54A have an angle γA projected on to the plane of 0° from the lateral direction that is along the x-axis and parallel to the major axis of the rectangular shape. In the embodiment of FIG. 5A, the first and second arrays of lines are straight.

Considering FIG. 5A, the optical turning film component 50 comprises an input surface 56 arranged to receive the light exiting from the waveguide 1 wherein the input surface 56 extends across a plane and output surface 58 faces the input surface 56.

The input surface 56 comprises: a first array of prismatic elements 52A each comprising a pair of facets 53AA, 53AB defining a ridge 54A therebetween, the ridges extending along a first array of lines across the plane in which the input surface 56 extends, which in the embodiment of FIG. 5A is the x-y plane.

The input surface 56 further comprises a second array of prismatic elements 52B each comprising a pair of facets 53BA, 53BB defining a ridge 54B therebetween, the ridges 54B extending along a second array of lines across the plane in which the input surface 56 extends.

The first array of lines and the second array of lines extend at different angles γA, γB projected on to the plane. In the embodiment of FIG. 5A, γA is parallel to the x-axis direction and thus is zero degrees while γB is non-zero angle from the x-axis direction.

FIG. 5B illustrates an exemplary method to provide a tool 60 that can be used in the replication of the turning film component 50. Tool 60 may comprise a metal material such as steel, nickel or copper for example. Cutting element 62A, such as a shaped diamond, may cut ridges 54A by translating tool 62A parallel to the x-axis. Cutting element 6213, such as a shaped diamond, may cut ridges 54B by translating tool 62A at angle in the x-y plane and inclined to the x-axis. After cutting, tool 60 has a shape that is inverted compared to the shape of the input surface 56 of the optical turning film component 50. During replication, such as molding, casting or other known replication methods the input surface 56 is formed in the turning film component 50.

Figure 5C:
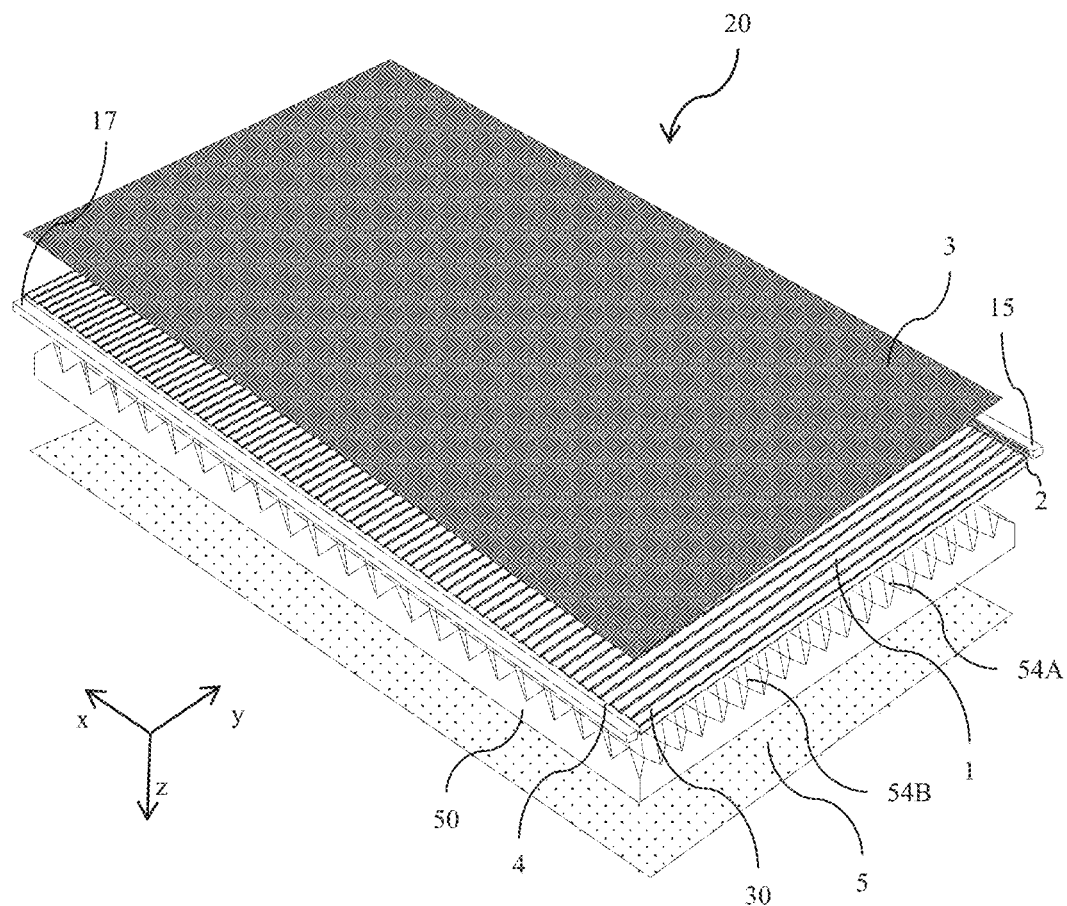
FIG. 5C is a schematic diagram illustrating a top perspective view of the optical stack of a switchable backlight.
Figure 5D:
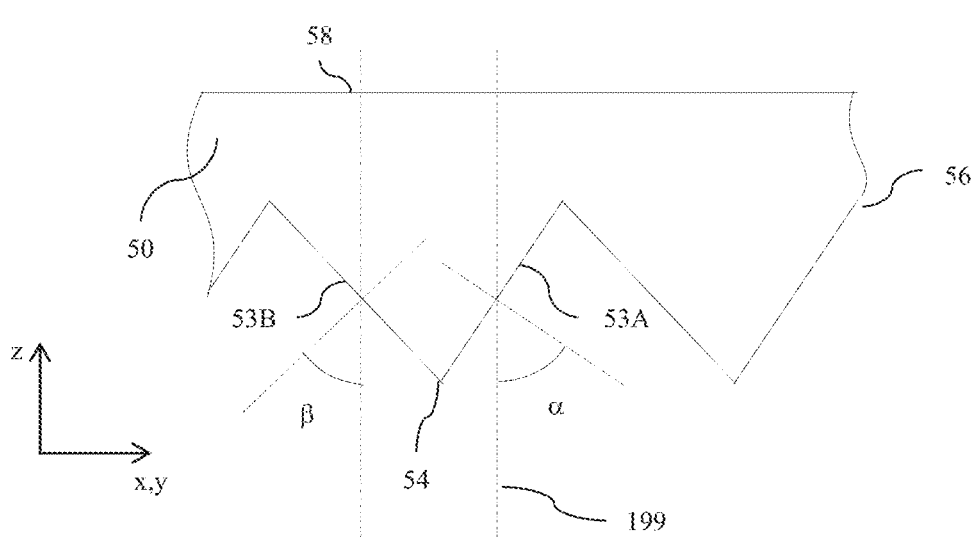
FIG. 5D is a schematic diagram illustrating a cross section of a light turning film component.

FIG. 5C is a schematic diagram illustrating a rear perspective view of the optical stack of the switchable backlight 20 of FIG. 4A. Ridges 54A of the component 50 are parallel to the x-axis which may be referred to as the lateral direction. Ridges 54B are inclined to the lateral direction in the plane. Features 30 of the waveguide 1 are extended in a direction orthogonal to the lateral direction (y-axis). Light sources 15, 17 are extended in the lateral direction along the first and second input sides 2,4 of the waveguide 1. Lobes 404, 408 are output from the backlight 20.

FIG. 50 is a schematic diagram illustrating a cross section of a light turning film component. Surface angles α and β are illustrated with respect to the direction 199 of the normal to the plane for facets 53A, 5313 in the plane comprising the ridges 54 and the optical axis 199.

Features of the embodiments of FIGS. 5A-D not discussed in further detail may be assumed to correspond to the features with equivalent reference numerals as discussed above, including any potential variations in the features.

Figure 6:
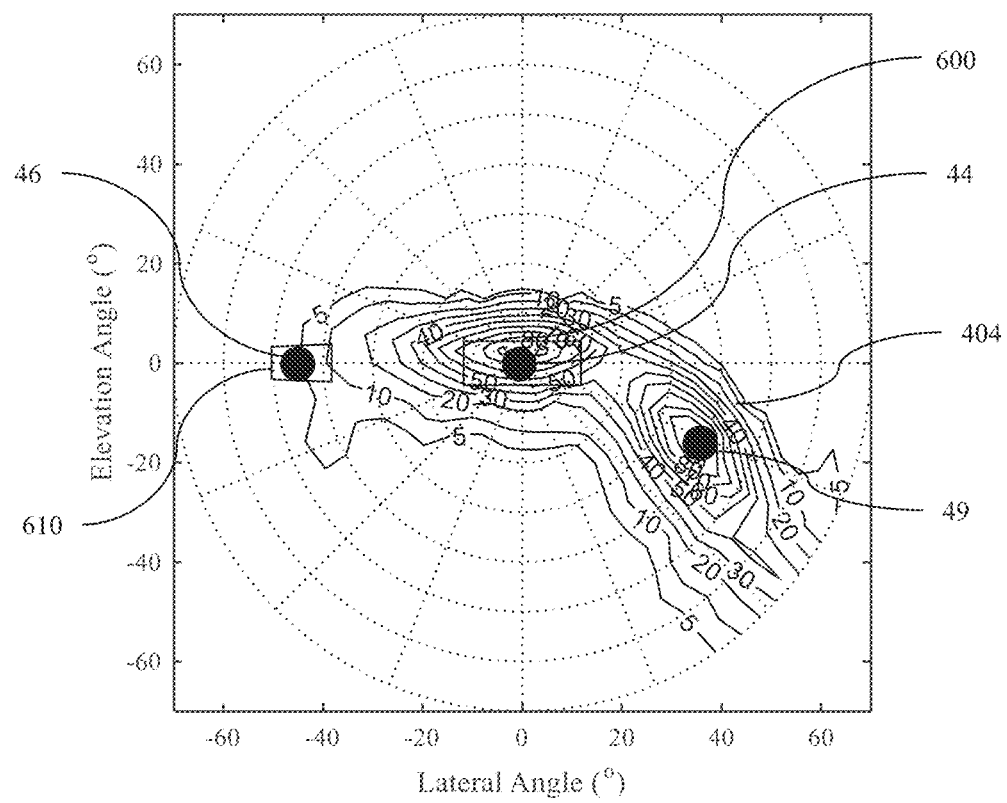
FIG. 6 is a schematic graph illustrating the polar and azimuthal variation of luminance for an illustrative backlight with light input at the first end of the waveguide.
Figure 7:
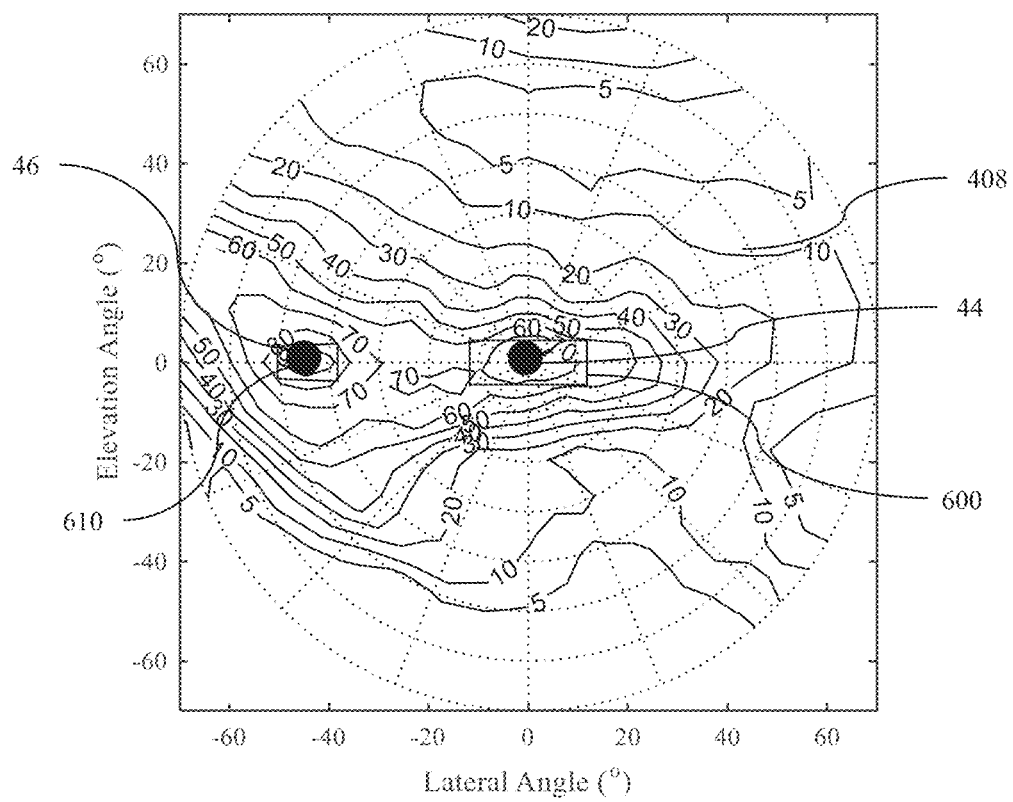
FIG. 7 is a schematic graph illustrating the polar and azimuthal variation of luminance for an illustrative backlight with light input at the second end of the waveguide.

Exemplary lobes 404, 408 from a backlight 20 will now be described,

FIG. 6 is a schematic graph illustrating the polar and azimuthal variation of luminance for an illustrative backlight with light input at the first end of the waveguide; and FIG. 7 is a schematic graph illustrating the polar and azimuthal variation of luminance for an illustrative backlight with light input at the second end of the waveguide for a collimated waveguide 1 of the type illustrated in FIG. 3B and the turning film component 50 with the illustrative embodiment of TABLE 1.

TABLE 1

| | |
|---|---|
| αA | 55.0° |
| βA | 57.1° |
| γA | 0.0° |
| αB | 50.1° |
| βB | 53.5° |
| γB | 36.5° |

FIG. 6 illustrates polar luminance profile for light from light source 15 at the first input side 2 that is collimated by the waveguide 1. Lobe 404 is provided that has two regions of peak luminance, one near a polar angle of 0° and an azimuthal angle of 0° and the other near a polar angle of 40° and an azimuthal angle of 337.5° (for an azimuthal angle of 0° that is in the easterly direction). By comparison, light input into the waveguide 1 at the second input side 4 from light source 17 has a wider solid angle of output because of output through facet 36 of the waveguide 1. Lobe 408 is provided that has two regions of peak luminance, one near a polar angle of 0° and an azimuthal angle of 0° and the other near a polar angle of 45° and an azimuthal angle of 180°.

Referring again to FIG. 2, the directions, (or lobes) 44 and 46 represent nominal locations for vehicle occupants 45, 47. The head-on occupant 45 near direction 44 sees a high luminance image in the output for light input at first and second light sides, and the off-axis occupant 47 sees a high luminance image for light input at the second side 4 but a low luminance image for light input at the first side 2. Advantageously the backlight may be switched between a privacy mode operation as shown in FIG. 6 and a share mode operation as shown in FIG. 7.

FIG. 6 further illustrates the field of view 600 of a passenger 45 viewing a 12" display of aspect ratio 8:3 at 700 mm, and the field of view 610 of driver 47 viewing the same display at 45 degrees.

TABLE 1 further illustrates that for the first and second arrays of prismatic elements 52A, 52B, the facets on opposite sides of the ridges 54A, 54B have facet angles αA, βB between a normal to the facet and a normal 199 to the plane across which the input surface extends that are different. Said difference in angles achieves control of location of output lobe directions from the respective prism arrays that has some independence. Control of lobe directions to first and second peak locations at directions 44, 46 for first and second light sources may be achieved. Advantageously observers or occupants may receive desirable luminance profiles in privacy and share modes of operation.

In other embodiments, the first and second arrays of lines may each have tangential angles γA, γB projected on to the plane of not more than 55° from the lateral direction. Facet angles αA, βA, αB, βB of respective facets 53AA, 53AB, 53BA, 53BB defined between a normal to the facet and a normal 199 to the plane across which the input surface extends may be between 40° and 70° and preferably between 47.5° and 62.5°.

It may be desirable to increase the security factor of a display in privacy mode comprising the backlight 20 of FIG. 4A and the light turning film component 50 with the polar output of FIG. 6. Operation of the display of FIG. 1A with polar control retarder arrangement of FIG. 1B will now be described.

Figure 8A:
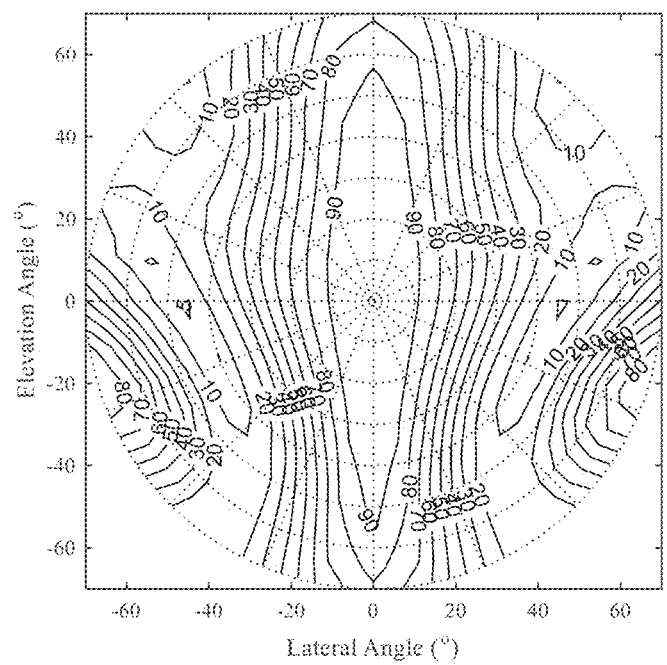
FIG. 8A is a schematic graph illustrating the polar and azimuthal variation of transmission of a switchable retarder arranged between parallel polarisers for switchable liquid crystal retarders driven for privacy mode.
Figure 8B:
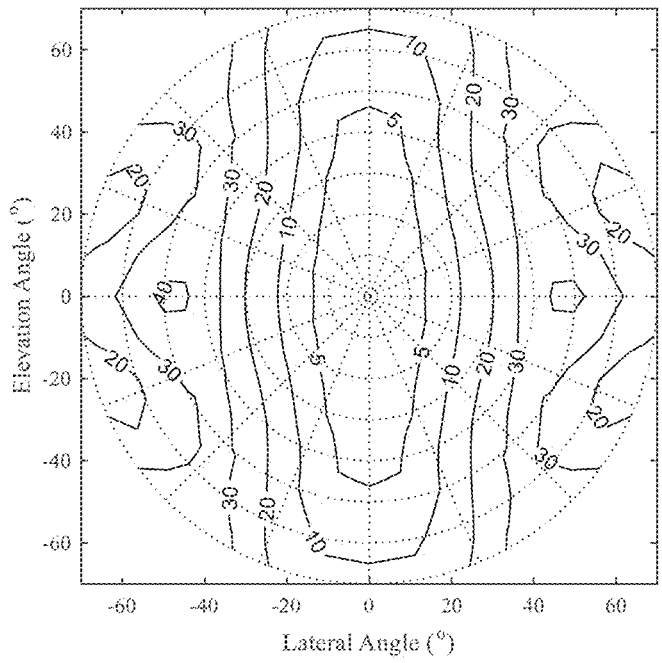
FIG. 8B is a schematic graph illustrating the polar and azimuthal variation of relative reflection of a switchable retarder arranged between a reflective polariser and absorbing polariser for switchable liquid crystal retarders driven for privacy mode.

FIG. 8A is a schematic graph illustrating the polar and azimuthal variation of transmission of a switchable polar control retarder 300 arranged between parallel polarisers 218, 302, 318 for switchable liquid crystal retarders 314 driven for privacy mode; and FIG. 8B is a schematic graph illustrating the polar and azimuthal variation of relative reflection of a switchable retarder arranged between a reflective polariser and absorbing polariser for switchable liquid crystal retarders driven for privacy mode with the illustrative embodiment of TABLE 2.

TABLE 2

| Alignment type | LC layer 314 retardance | Additional passive retarder 330 type | Additional passive retarder 330 retardance |
|---|---|---|---|
| Homogeneous | 750 nm | | |
| Homogeneous | | Negative C-plate | −440 nm |

Figure 9A:
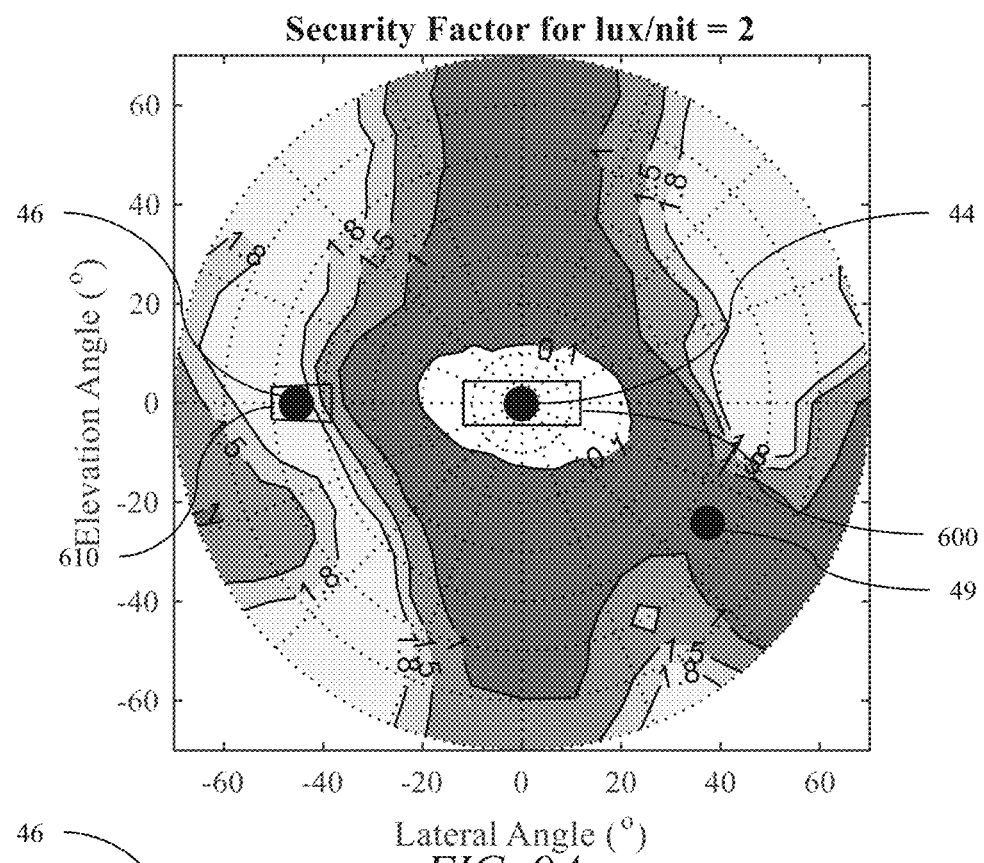
FIG. 9A is a schematic graph illustrating the polar and azimuthal variation of visual security factor, S in a privacy mode of operation for a display head-on luminance, of value $Y_{max}$ measured in nits that is half of the illuminance of value I measured in lux.
Figure 9B:
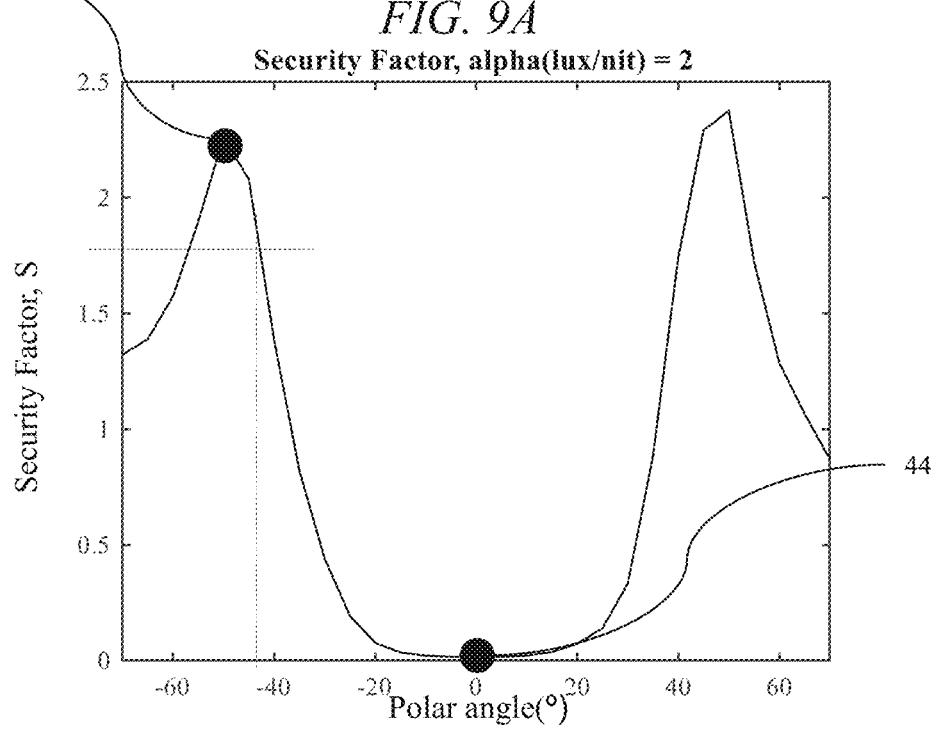
FIG. 9B is a schematic graph illustrating the polar variation of visual security factor, S for zero elevation in a privacy mode of operation for a display head-on luminance, of value $Y_{max}$ measured in nits that is half of the illuminance of value I measured in lux.

FIG. 9A is a schematic graph illustrating the polar and azimuthal variation of visual security factor, S for the arrangement of FIG. 1B, and the backlight with polar output profile of FIG. 6 in a privacy mode of operation for a display head-on luminance, of value $Y_{max}$ measured in nits that is half of the illuminance of value I measured in lux; and FIG. 9B is a schematic graph illustrating the polar variation of visual security factor, S for zero elevation.

Field of view 600 illustrates that the advantageously passenger 45 sees the display with high image visibility (S<0.1) across its width, while field of view 610 illustrates that advantageously the driver 47 sees a private image (S≥1.0) across the entire width and an invisible image (S≥1.5) for most of the display area.

Figure 10:
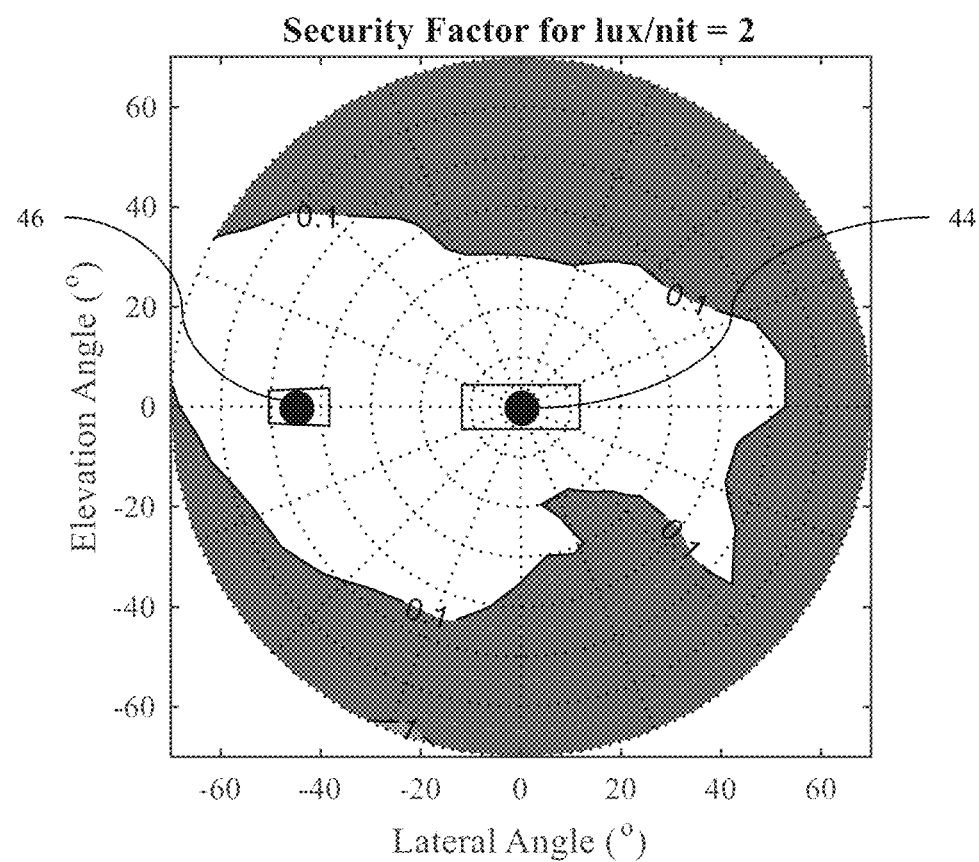
FIG. 10 is a schematic graph illustrating the polar and azimuthal variation of visual security factor, S for the arrangement of FIG. 1A in a public mode of operation for a display head-on luminance, of value $Y_{max}$ measured in nits that is half of the illuminance of value measured in lux.

FIG. 10 is a schematic graph illustrating the polar and azimuthal variation of visual security factor, S for the arrangement of FIG. 1B, and the backlight 20 with polar output profile of FIG. 7 in a public mode of operation for a display head-on luminance, of value $Y_{max}$ measured in nits that is half of the illuminance of value I measured in lux. Advantageously both occupants 45, 47 see a high luminance image with high image visibility (low security factor, S).

The use of stray light in a vehicle of a display operating in privacy mode will now be described.

Returning to the polar profile in a privacy mode of operation of FIG. 6, a peak location near direction 49 is provided in privacy mode. Returning to the lobe directions in the vehicle 650 of FIG. 2, such light rays 414 near direction 49 are directed towards the internal surface 652 of the vehicle. The different lobes into which light exiting from the waveguide is deflected are lobes respectively directed at a location of an occupant 45 in the vehicle 650 and at a location 652 of an internal surface of the vehicle 650.

On reflection at said internal surface 652, light rays may be directed as light rays 416 by reflection from the display 100 towards the occupant 47. Reflections may by means of front surface Fresnel reflections and by means of reflection from reflective polariser 302 in FIG. 1A as illustrated in FIG. 8B.

The internal surface 652 may comprise a reflective material and for example may comprise retroreflective material to increase the luminance of reflected light towards the occupant 47. The luminance of reflected light is conveniently increased, advantageously increasing the security factor, S enhanced, particularly in conditions with low ambient light levels such as at night.

It may be desirable to further increase the uniformity of the display.

Figure 11:
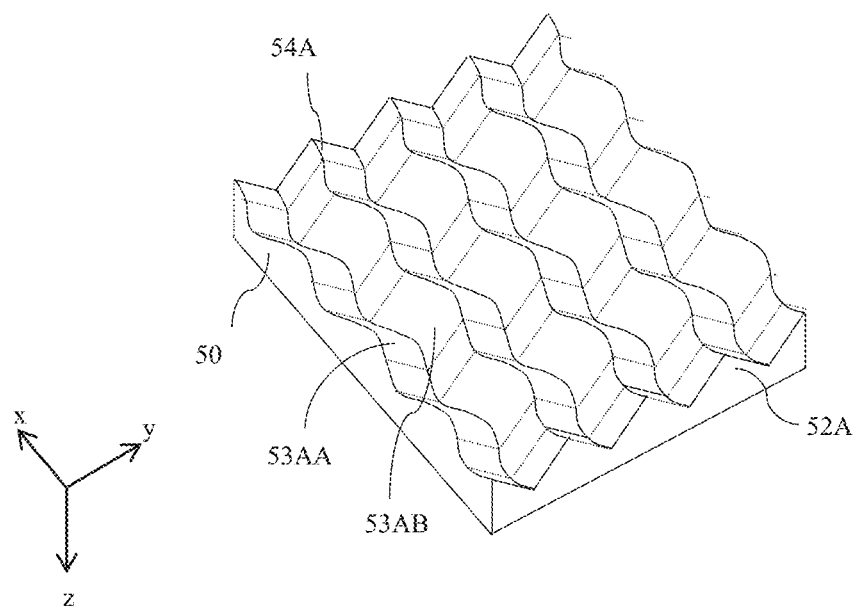
FIG. 11 is a schematic diagram illustrating a rear perspective view of the first array of elongate prismatic elements wherein the ridges and facets comprise wobble.

FIG. 11 is a schematic diagram illustrating a rear perspective view of the first array of elongate prismatic elements wherein the ridges and facets comprise wobble. For ease of illustration, the wobble is illustrated for first prism array 52A. The second prism array 52B may further be provided with wobble. Advantageously display uniformity may be increased. Visibility of artefacts arising from manufacturing defects of waveguide 1 may be reduced, advantageously increasing yield and reducing cost. Visibility of defects from damage in use of waveguide 1 may be reduced, advantageously increasing lifetime.

Figure 12A:
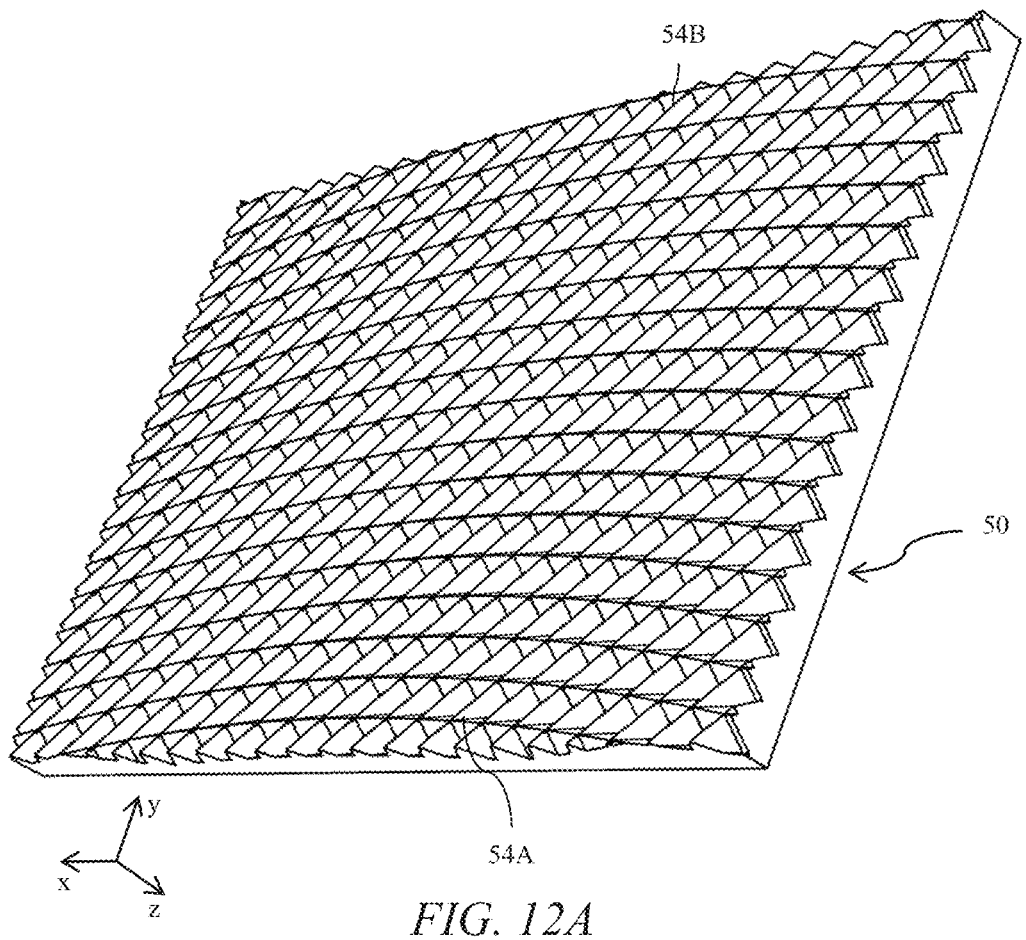
FIG. 12A is a schematic diagram illustrating a side perspective view of a turning film comprising first and second arrays of prismatic elements wherein the first array of prismatic elements comprises curved prismatic elements.

FIG. 12A is a schematic diagram illustrating a side perspective view of a turning film comprising first and second arrays of prismatic elements wherein the first array of prismatic elements comprises curved prismatic elements. In the embodiment of FIG. 12A, the first array of lines for ridges 54A are curved and the second array of lines for ridges 54B are straight.

In other embodiments the first and second array of lines for ridges 54A, 54B may be curved.

In the case of curved facets, the first array of lines of ridges 54A have a first arithmetic mean tangential angle γA projected on to the plane and the second array of lines of ridges 54B have a second arithmetic mean tangential angle γB projected on to the plane, the second arithmetic mean tangential angle γB being greater than the first arithmetic mean tangential angle γA. The first array of lines has an average tangential angle γA projected on to the plane in which the input surface extends of 0° from the lateral direction. Features of the embodiment of FIG. 12A not discussed in further detail may be assumed to correspond to the features with equivalent reference numerals as discussed above, including any potential variations in the features.

The operation of the curved ridges 54 of the turning film component 50 will now be described.

Figure 12B:
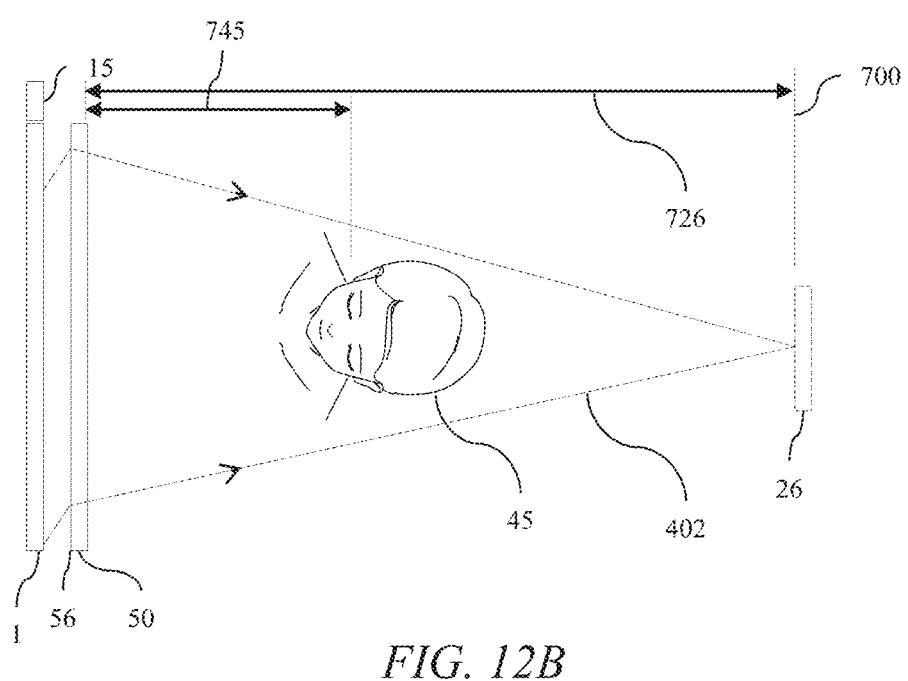
FIG. 12B is a schematic diagram illustrating a top view of an illumination apparatus comprising a turning film component with first and second arrays of prismatic elements wherein the first array of prismatic elements comprises curved prismatic elements.

FIG. 12B is a schematic diagram illustrating a top view of an illumination apparatus comprising a turning film component 50 with first and second arrays of prismatic elements 52A, 52B wherein the first array of prismatic elements comprises curved prismatic elements 52A. Output rays 402 from the waveguide 1 are output onto the input surface 56 of the turning film component 50 with ray directions that are near to grazing incidence. The turning film directs the light from across the width of the display to common optical window 26 at a window plane 700 at a distance 726 from the illumination apparatus. When the illumination apparatus is used in a backlight 20 for a display apparatus 100, the distance 726 is arranged to be greater than a typical viewing distance 745 for the observer 45. The use of the term optical window 26 in the present embodiments is distinct and different from the use of the term window when used to refer to sheets or panes of glass or other transparent material such as plastics for use in house windows, car windows and windscreens, and other types of protective windows. Such sheets or panes do not contribute to the creation of desirable viewing regions with improved uniformity as described herein.

Features of the embodiment of FIG. 12B not discussed in further detail may be assumed to correspond to the features with equivalent reference numerals as discussed above, including any potential variations in the features.

Image uniformity will now be described.

Figure 13A:
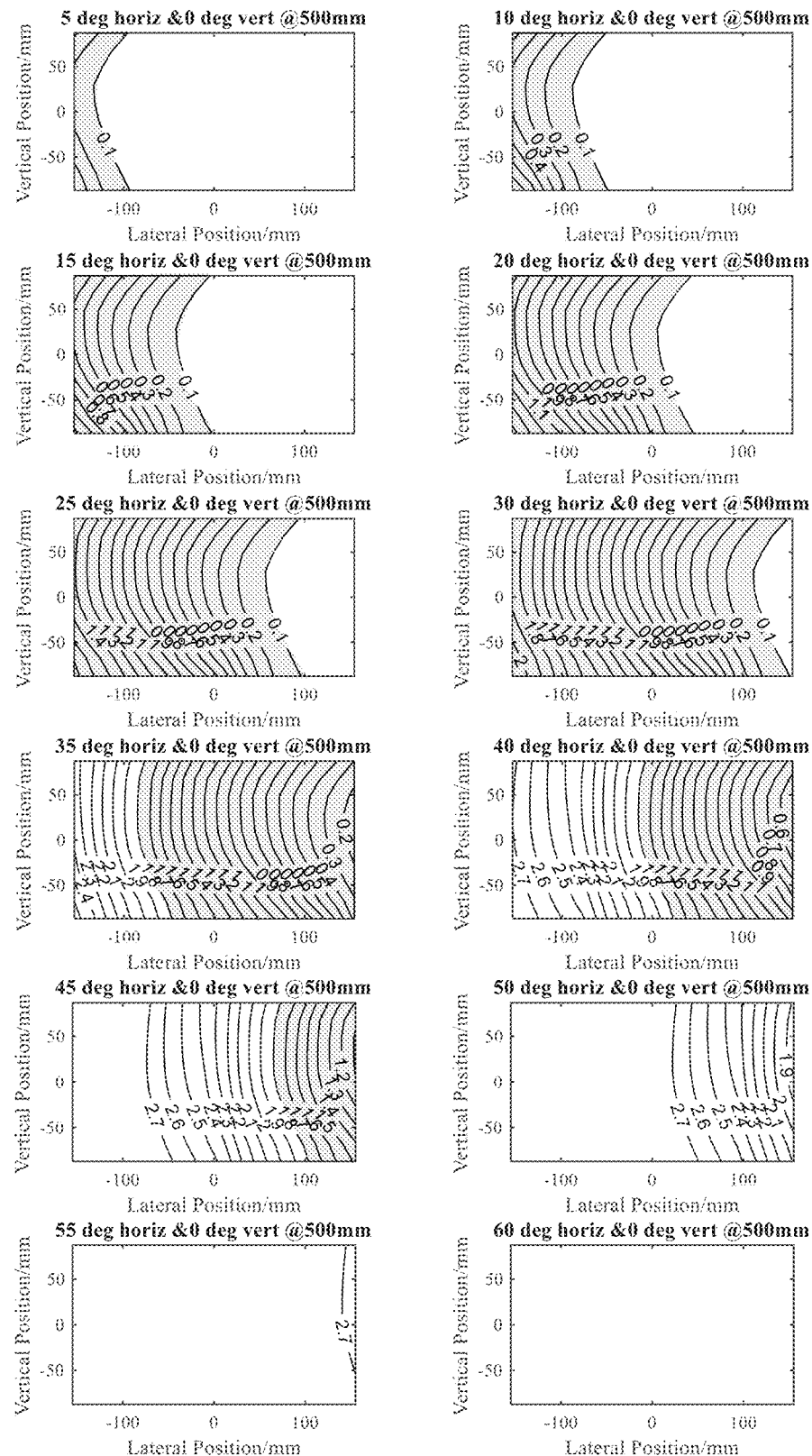
FIG. 13A is an array of schematic graphs illustrating the variation of Security Factor, S for various different primary user viewing angles in a display of FIG. 1B comprising the turning film of FIG. 5A.
Figure 13B:
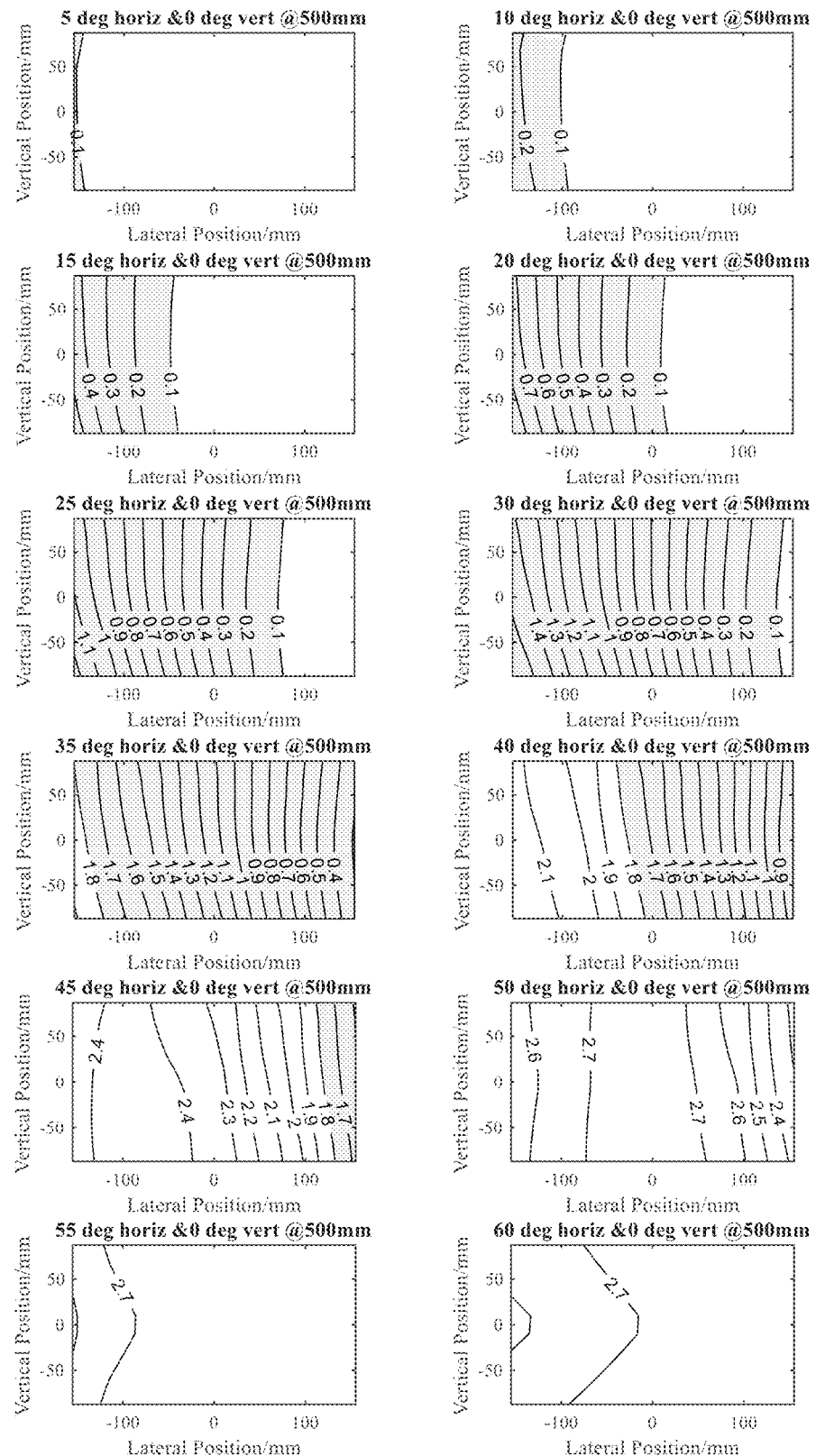
FIG. 13B is an array of schematic graphs illustrating the variation of Security Factor, S for various different primary user viewing angles in a display of FIG. 1B comprising the turning film of FIG. 12A.

FIG. 13A is an array of schematic graphs illustrating the variation of Security. Factor, S for various different primary user viewing angles in a display of FIG. 1B comprising the straight facet turning film of FIG. 5A; FIG. 13B is an array of schematic graphs illustrating the variation of Security Factor, S for various different primary user viewing angles in a display of FIG. 1B comprising the curved facet turning film of FIG. 12A and TABLE 3 and the polar control retarder of TABLE 4 for a display head-on luminance, of value $Y_{max}$ measured in nits that is half of the illuminance of value I measured in lux.

TABLE 3

| | |
|---|---|
| Display width | 310 mm |
| Display height | 174 mm |
| Observer distance | 500 mm |
| Window 26 distance 726 | 800 mm |
| Illumination profile | FIG. 6 |

TABLE 4

| Alignment type | LC layer 314 retardance | Additional passive retarder 330 type | Additional passive retarder 330 retardance |
|---|---|---|---|
| Homogeneous Homeotropic | 1250 nm | | |
| | | Negative C-plate | −1000 nm |

Shaded regions in FIG. 13A and FIG. 13B represent regions of 0<S<1.8 where either an observer sees an image with undesirable image contrast (S>0.1) or an off-axis occupant or snooper sees an image which is not invisible (S<1.8). Advantageously the curved facets of the present disclosure achieve increased area of display over which desirable image contrast is seen close to on-axis locations. Advantageously the curved facets achieve increased area of display over which desirable image invisibility is seen at off-axis locations.

In other embodiments, the distance 726 may be arranged close to the nominal viewing distance 745. In such embodiments, the uniformity will be further increased in comparison to straight ridges 54A.

It may be desirable to increase the efficiency of illumination to the off-axis occupant of a vehicle in comparison to the arrangement that achieves the lobe profile of FIG. 7.

Figure 14A:
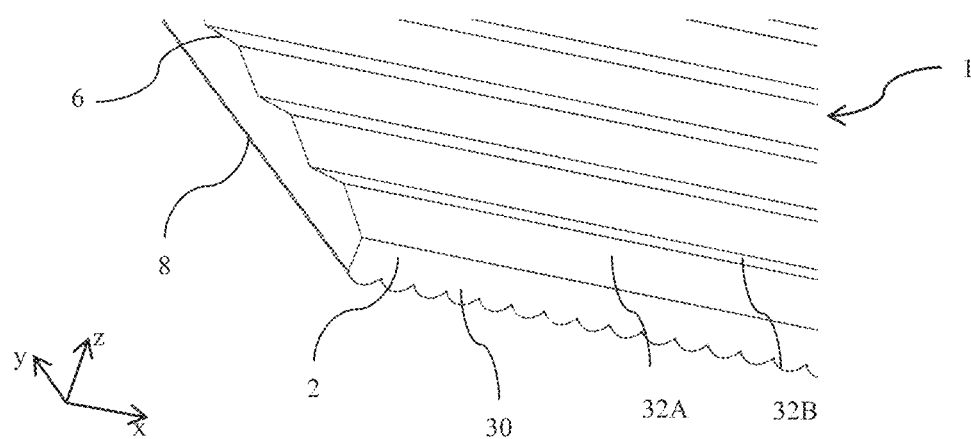
FIG. 14A is a schematic diagram illustrating a top perspective view of a collimating waveguide comprising linear prismatic and orthogonal lenticular surfaces arranged on opposite sides of a waveguide arranged to provide similar solid angles of output for light input at first and second input sides.

FIG. 14A is a schematic diagram illustrating a top perspective view of a collimating waveguide 1 comprising linear prismatic microstructure comprising facets 32A, 32B and orthogonal lenticular surfaces 30 arranged on opposite sides of the waveguide 1 arranged to provide similar solid angles of output for light input at first and second input sides 2, 4 (input side 4 not shown). In comparison to the waveguide 1 of FIG. 4B, facets 32, 36 are replaced by facets 32A, 32B which have substantially equal and opposite facet tilt angles with respect to the normal to the plane in which the waveguide 1 extends.

Figure 14B:
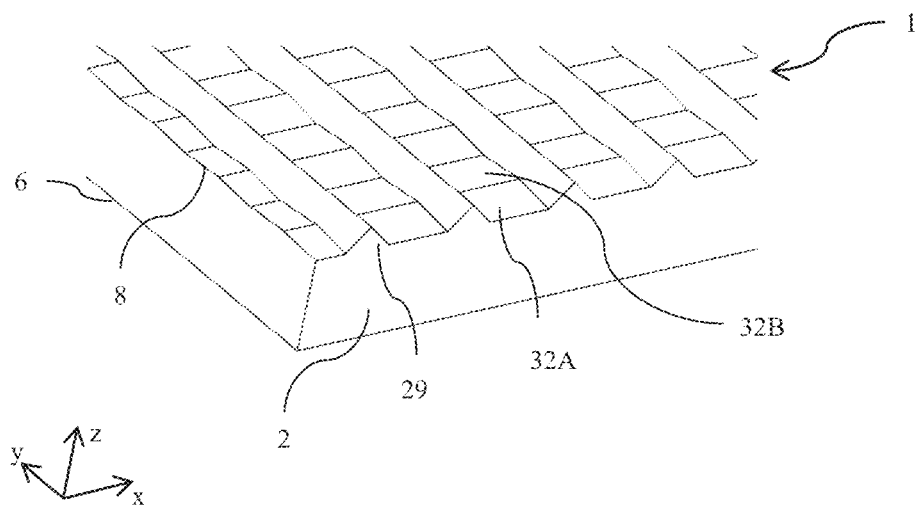
FIG. 14B is a schematic diagram illustrating a top perspective view of a collimating waveguide comprising linear prismatic and orthogonal prismatic surfaces arranged on the same side of a waveguide arranged to provide similar solid angles of output for light input at first and second input sides.

FIG. 14B is a schematic diagram illustrating a top perspective view of a collimating waveguide 1 comprising linear prismatic microstructures 32A, 32B and prisms 29 with ridges that are orthogonal to the microstructures 32A, 32B arranged on the same side of a waveguide 1 and arranged to provide similar solid angles of output for light input at first and second input sides 2, 4 (input side 4 not shown).

Figure 15:
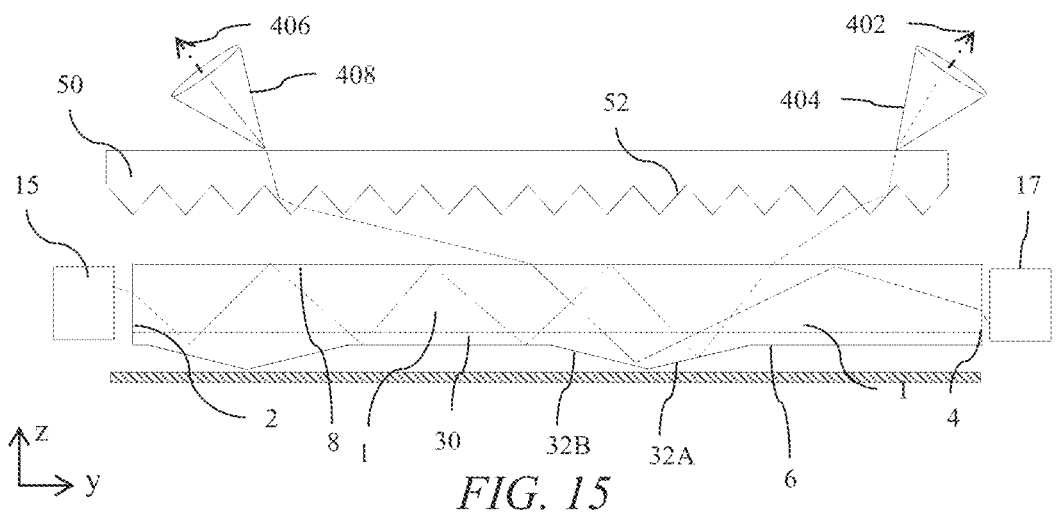
FIG. 15 is a schematic diagram illustrating a side view of a switchable backlight with the same solid angles in first and second lobe directions.

FIG. 15 is a schematic diagram illustrating a side view of a switchable backlight with the same solid angles in first and second lobe directions. The operation of the waveguide 1 is similar to that shown in FIG. 3A for example, however in the embodiments of FIG. 14A and FIG. 14B the waveguide 1 is arranged to cause light 402 from the at least one first light source 15 and the at least one second light source 17 to exit from the waveguide 1 with a common angular distribution, that is the lobes 404, 408 have a similar solid angle but are directed in opposite directions from the waveguide 1.

Features of the embodiments of FIGS. 14-16A not discussed in further detail may be assumed to correspond to the features with equivalent reference numerals as discussed above, including any potential variations in the features.

Another alternative backlight 20 comprising two waveguides will now be described.

Figure 16A:
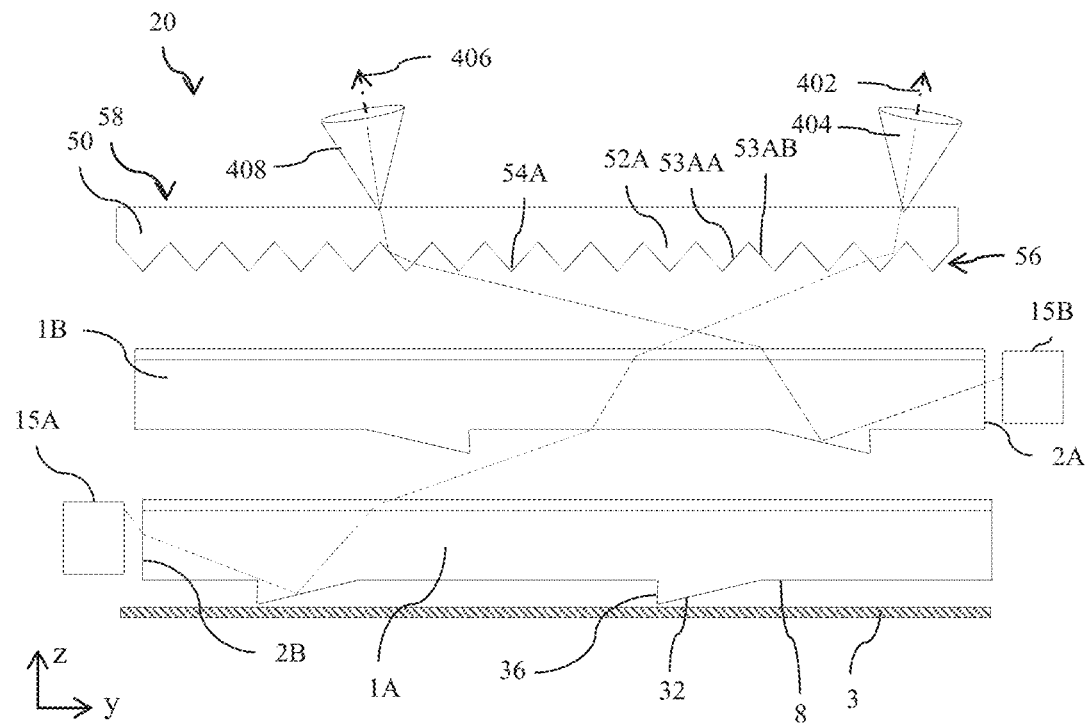
FIG. 16A is a schematic diagram illustrating a side view of a switchable backlight with the same solid angles in first and second lobe directions comprising first and second stacked waveguides.

FIG. 16A is a schematic diagram illustrating a side view of a switchable backlight 20 with the same solid angles in first and second lobe directions 402, 406 comprising first and second stacked waveguides 1A, 1B. Waveguides 1A, 1B may be an alternative to the single waveguide 1 of FIG. 15 or other dual end injection embodiments described elsewhere herein. Features of the embodiment of FIG. 16A not discussed in further detail may be assumed to correspond to the features with equivalent reference numerals as discussed above, including any potential variations in the features.

In comparison to the arrangement of FIG. 15, each waveguide 1A, 1B is provided with light sources ISA, 15B at the respective input ends 2A, 2B. Such waveguides 1A, 1B may, be arranged to advantageously achieve increased luminance uniformity along the waveguides 1 in comparison to the dual end injection of FIG. 15.

Figure 16B:
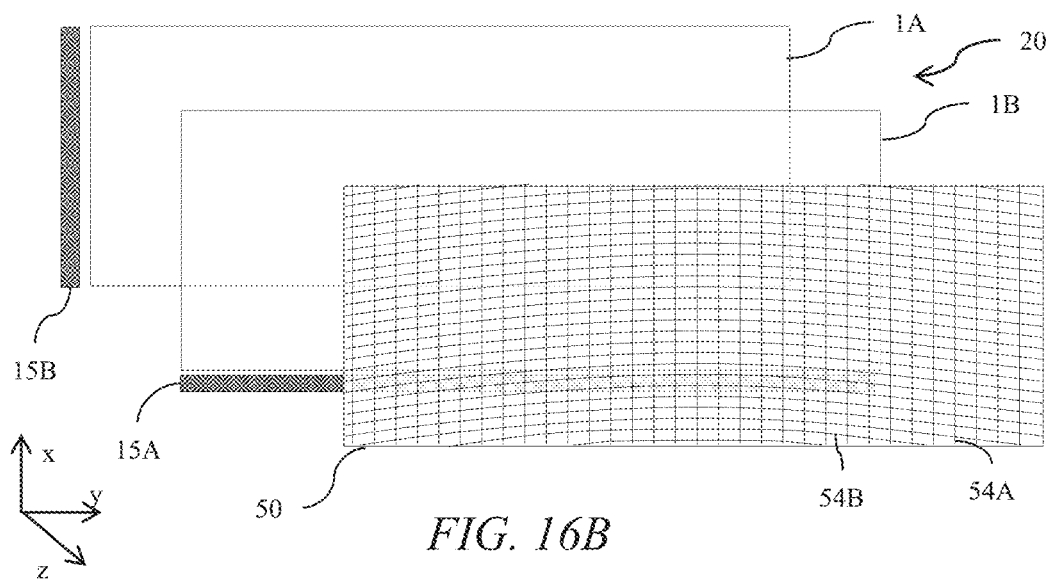
FIG. 16B is a schematic diagram illustrating a front perspective view of the papillated backlight of FIGS. 16A-B comprising an optical turning film with a first array of prismatic elements that is linear and a second array of prismatic elements that is curved.

FIG. 16B is a schematic diagram illustrating a front perspective view of a backlight 20 comprising an optical turning film 50 with a first array of prismatic elements 54A that is linear and a second array of prismatic elements 54B that is curved. Features of the embodiment of FIG. 16B not discussed in further detail may be assumed to correspond to the features with equivalent reference numerals as discussed above, including any potential variations in the features.

In the alternative embodiment of FIG. 16B, the light sources 15B are arranged on the left-hand side of the waveguide 1B and the light sources 15A are arranged on the lower side of the waveguide 1A. The peaks 54B are orthogonal to the lateral direction and the peaks 54A are curved along the lateral direction.

The output illumination from an illustrative backlight 20 of FIG. 16B will now be described.

Figure 16C:
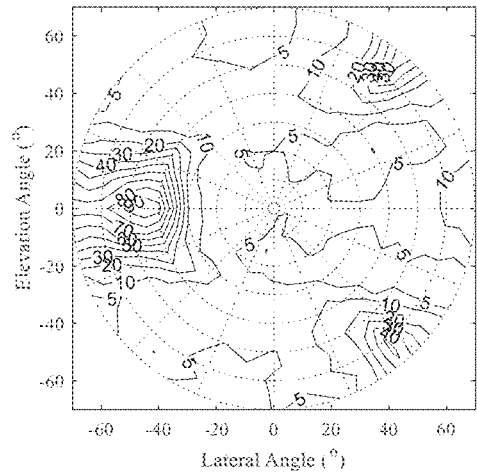
FIG. 16C is a schematic graph illustrating the polar variation of luminance for the backlight of FIGS. 16A-B for light from the first light source.
Figure 16D:
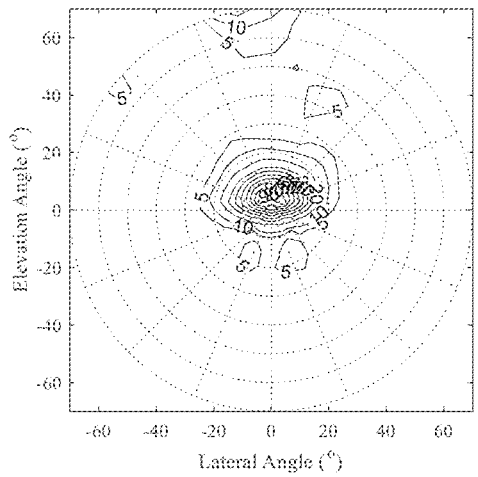
FIG. 16D is a schematic graph illustrating the polar variation of luminance for the backlight of FIGS. 16A-B for light from the second light source.
Figure 16E:
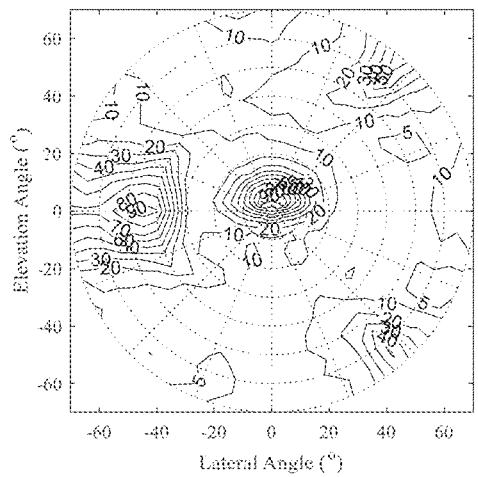
FIG. 16E is a schematic graph illustrating the polar variation of luminance for the backlight of FIGS. 16A-B for light from the first and second light sources.

FIG. 16C is a schematic graph illustrating the polar variation of luminance for the backlight 20 of FIG. 16B comprising the waveguides 1A, 1B similar to that of FIG. 4B for light from the first light source 15A FIG. 16D is a schematic graph illustrating the polar variation of luminance for the backlight 20 of FIG. 16B comprising the waveguides 1A, 1B of FIG. 4B for light from the second light source 15B; and FIG. 16E is a schematic graph illustrating the polar variation of luminance for the backlight of FIG. 16B comprising the waveguides 1A, 1B of FIG. 4B for light from the first and second light sources 15A, 15B.

Advantageously a backlight 20 suitable for use in a switchable privacy display 100 of the type illustrated in FIG. 2 may be provided. A privacy mode to the passenger 45 may be provided so the driver 47 cannot see the displayed image by illumination of light source 15B. A low power mode to the passenger 45 may be provided by illumination of light source 15B. A low power mode to the driver 47 may be provided by illumination of light source 15A. A sharing mode to the passenger 45 and driver 47 may be provided by illumination of light sources 15A, 15B.

The operation of the waveguides of the types illustrated in FIG. 14A will now be described together with the turning film component 50 of FIG. 5A.

Figure 17A:
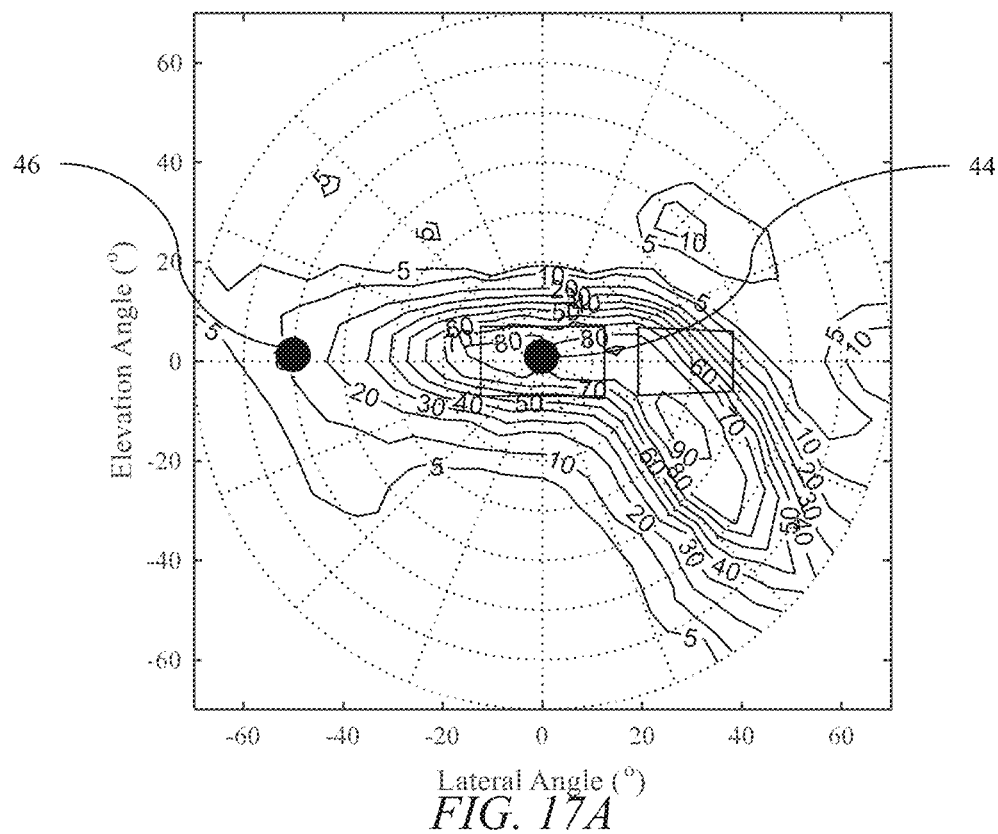
FIG. 17A is a schematic graph illustrating the polar and azimuthal variation of output luminance of the collimated waveguide of FIG. 14A and turning film of FIG. 5A for light input from light sources at a first input side for privacy mode of operation.
Figure 17B:
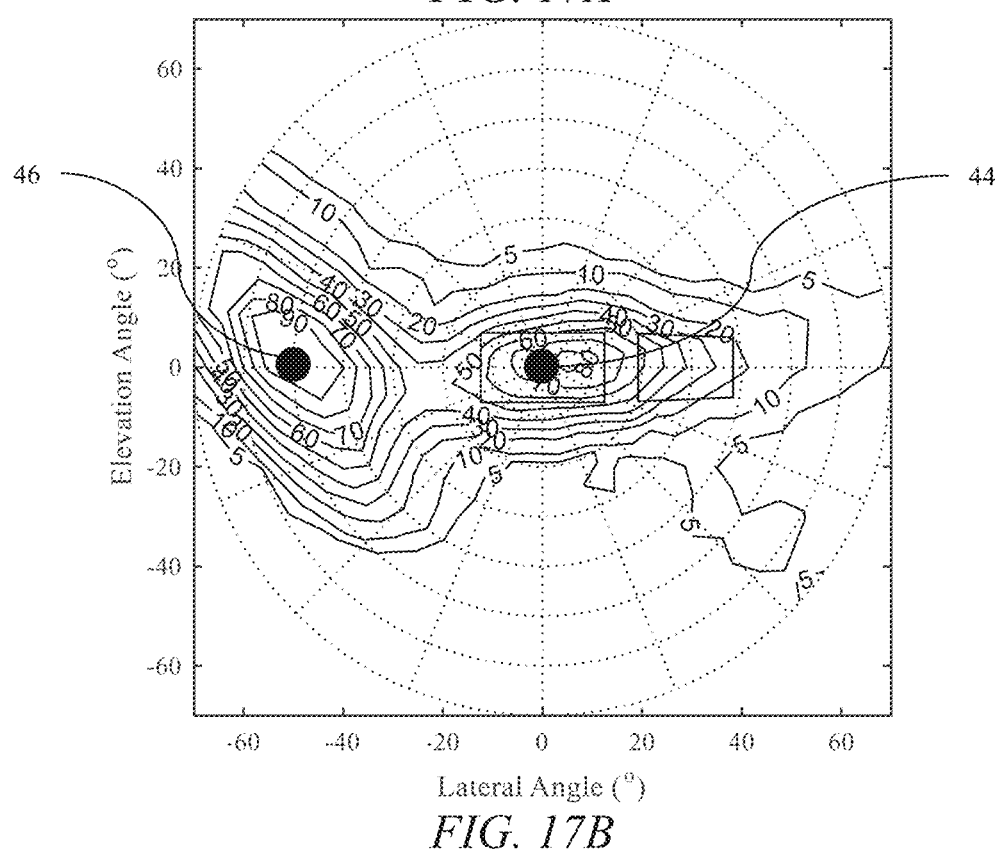
FIG. 17B is a schematic graph illustrating the polar and azimuthal variation of output luminance of the collimated waveguide of FIG. 14A and turning film of FIG. 5A for light input from light sources at a second input side for public mode of operation.

FIG. 17A is a schematic graph illustrating the polar and azimuthal variation of output luminance of the collimated waveguide of FIG. 14A and turning film of FIG. 5A for light input from light sources at a first input side for privacy mode of operation; and FIG. 17B is a schematic graph illustrating the polar and azimuthal variation of output luminance of the collimated waveguide of FIG. 14A and turning film of FIG. 5A for light input from light sources at a second input side for public mode of operation, with the parameters of light turning film of TABLE 5.

TABLE 5

| | |
|---|---|
| αA | 56.5° |
| βA | 56.5° |
| γA | 0.0° |
| αB | 51.8° |
| βB | 61.2° |
| γB | 36.4° |

Advantageously in comparison to the public mode of FIG. 7, a high brightness public mode may be achieved with higher efficiency.

Figure 18:
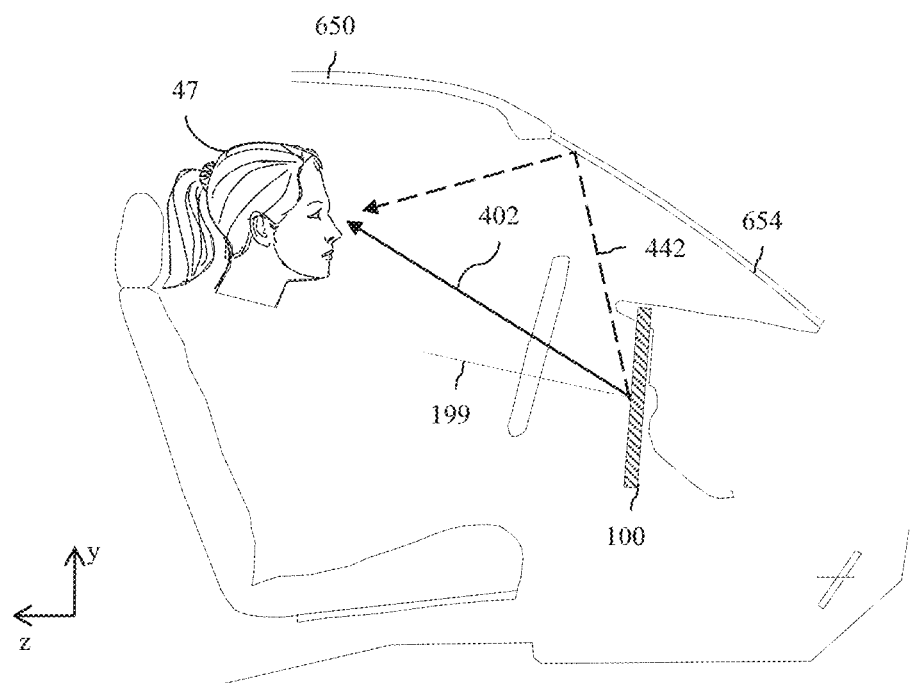
FIG. 18 is a schematic diagram illustrating a side view of a privacy display in an automotive vehicle.

FIG. 18 is a schematic diagram illustrating a side view of a display 100 in an automotive vehicle 650. In comparison to the arrangement described hereinbefore, the preferred orientation for the display 100 has a normal 199 to the plane in which the waveguide 1 and turning film component 50 extend that is nearer to horizontal. In such an arrangement the nominal viewing direction for the occupants 45, 47 is above the axis, and it would be preferable to provide increased efficiency in these directions. Further it would be desirable to reduce the luminance of rays 442 in polar directions around direction 442 that contribute to reflections from windscreen 654.

Features of the embodiment of FIG. 18 not discussed in further detail may be assumed to correspond to the features with equivalent reference numerals as discussed above, including any potential variations in the features.

Optical profiles suitable for use in the geometry of FIG. 18 will now be further described.

Figure 19A:
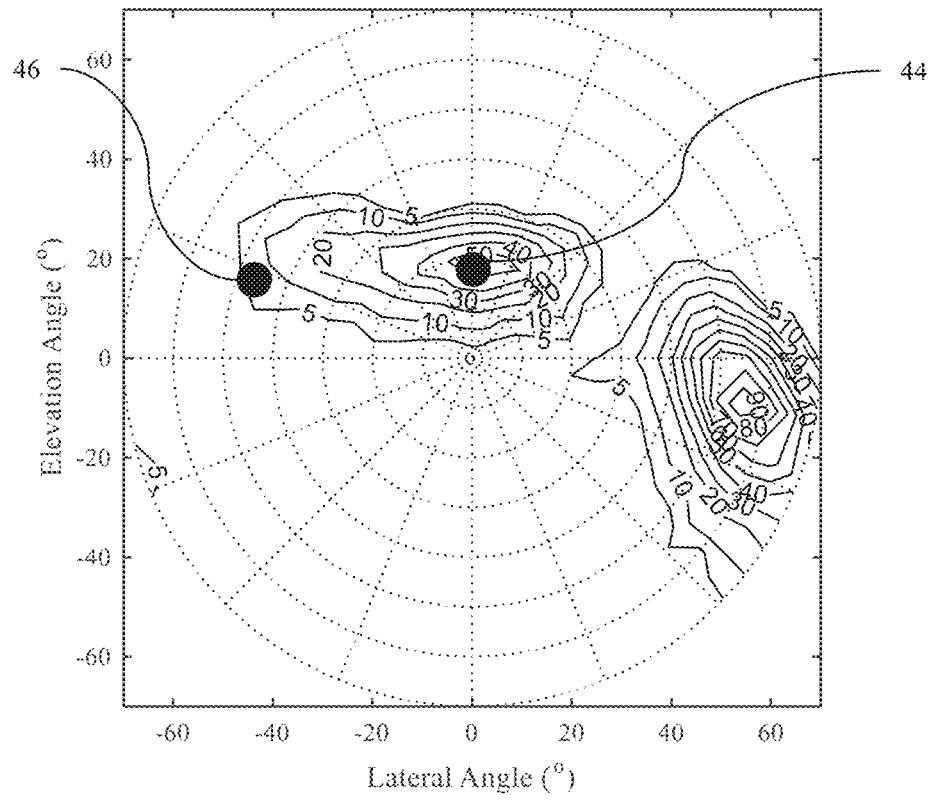
FIG. 19A is a schematic graph illustrating the polar and azimuthal variation of output luminance of the collimated waveguide of FIG. 3B and off-axis turning film similar to that of FIG. 5A for light input from light sources at the first input side for privacy mode of operation.
Figure 19B:
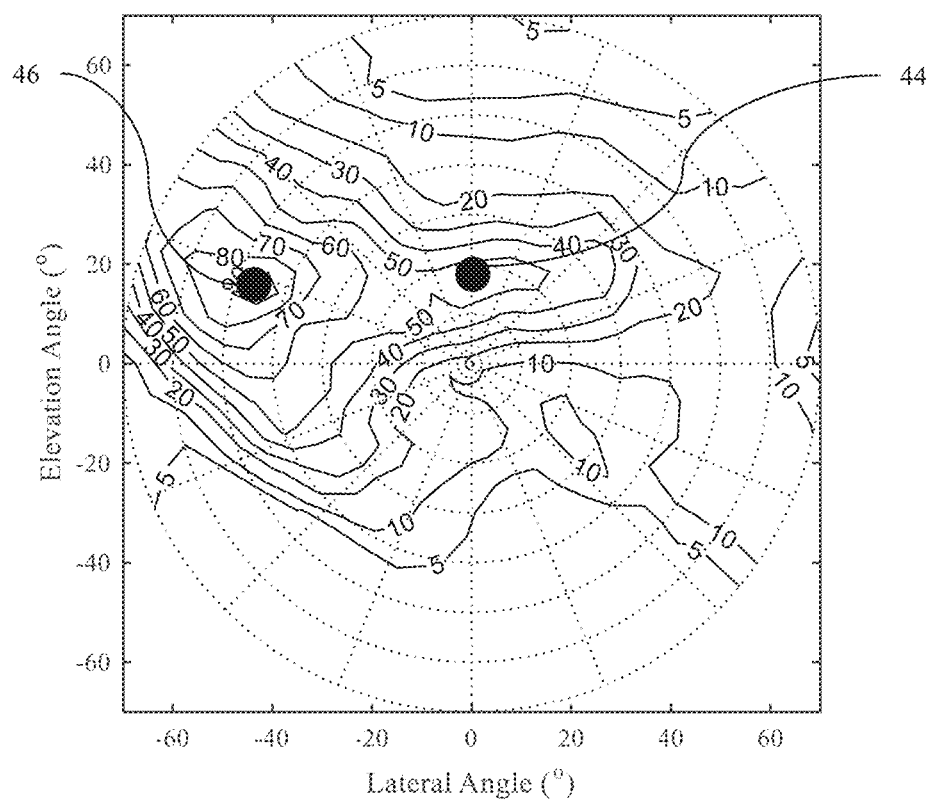
FIG. 19B is a schematic graph illustrating the polar and azimuthal variation of output luminance of the collimated waveguide of FIG. 3B and off-axis turning film similar to that of FIG. 5A for light input from light sources at the second input side for public mode of operation.
Figure 19C:
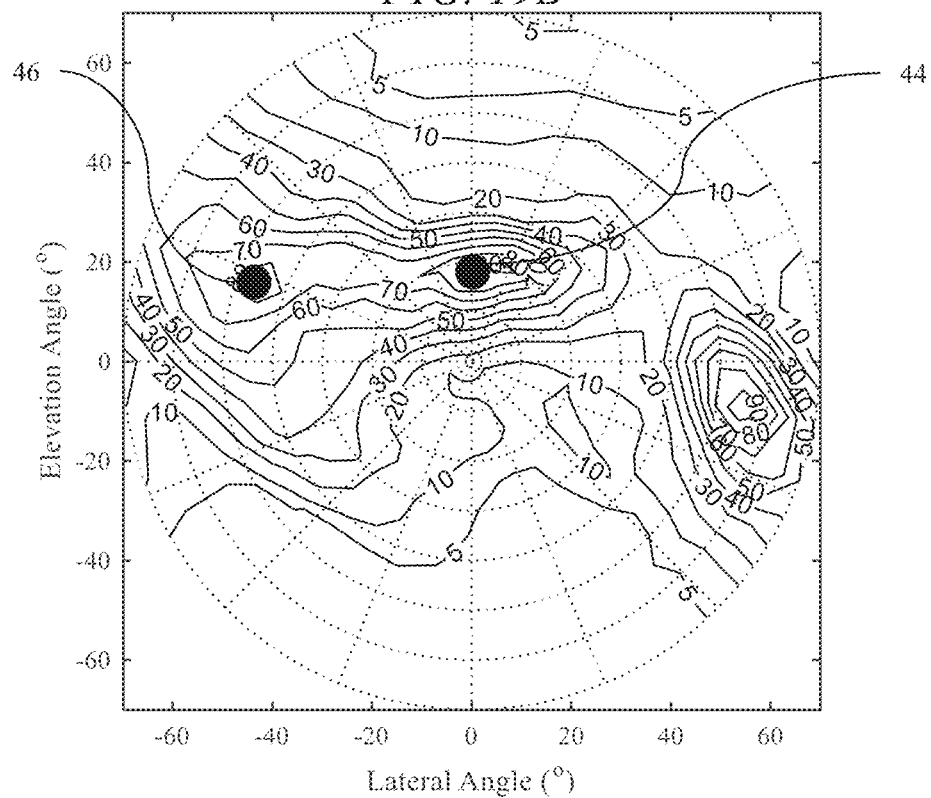
FIG. 19C is a schematic graph illustrating the polar and azimuthal variation of output luminance of the collimated waveguide of FIG. 3B and off-axis turning film similar to that of FIG. 5A for light input from light sources at both the first and second input sides for public mode of operation.

FIG. 19A is a schematic graph illustrating the polar and azimuthal variation of output luminance of the collimated waveguide of FIG. 3B and off-axis turning film similar to that of FIG. 5A for light input from light sources at the first input side for privacy mode of operation; FIG. 19B is a schematic graph illustrating the polar and azimuthal variation of output luminance of the collimated waveguide of FIG. 3B and off-axis turning film similar to that of FIG. 5A for light input from light sources at the second input side for public mode of operation; and FIG. 19C is a schematic graph illustrating the polar and azimuthal variation of output luminance of the collimated waveguide of FIG. 3B and off-axis turning; film similar to that of FIG. 5A for light input from light sources at both the first and second input sides for public mode of operation. The profiles of FIGS. 19A-C are provided by backlight 20 of the type illustrated in FIG. 4A, the optical light turning film 50 of FIG. 5A and the facet angles of TABLE 6.

TABLE 6

| | |
|---|---|
| αA | 61.6° |
| βA | 50.5° |
| γA | 0.0° |
| αB | 56.3° |
| βB | 56.3° |
| γB | 43.4° |

FIGS. 19A-B illustrate in privacy and public modes respectively that a look-down location can be provided to the occupants by adjustment of facet angles and orientations. FIG. 19B further illustrates that the share mode brightness may not be matched between the two directions 44, 46. FIG. 19C illustrates an embodiment wherein both light sources 15,17 are operated with equal luminous flux, advantageously achieving similar luminance for both occupants.

It may be desirable to provide different outputs for different regions of a display.

Figure 20:
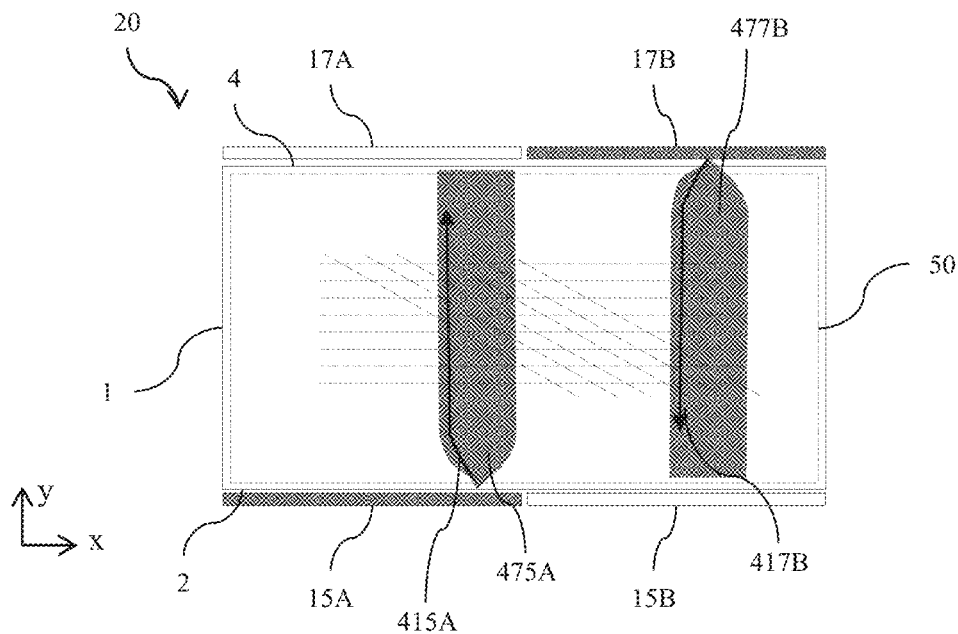
FIG. 20 is a schematic diagram illustrating a top view of a segmented backlight.

FIG. 20 is a schematic diagram illustrating a top view of some elements of a backlight 20 that is segmented. Features of the embodiment of FIG. 20 not discussed in further detail may be assumed to correspond to the features with equivalent reference numerals as discussed above, including any potential variations in the features.

First light source 15 comprises first and second parts 15A, 15B and second light source 17 comprises first and second parts 17A, 17B. Waveguide 1 may be of the type illustrated elsewhere herein, or may be first and second waveguides 1A, 1B for example as illustrated in FIG. 16A, in which case light sources 15AA, 15AB and light sources 15BA, 15BB are provided at respective ends of the waveguide.

Light rays 415A propagating within the waveguide 1 are input with an expanding cone in the lateral direction. The microstructures on the surfaces 6, 8 of the waveguide 1 adjust the ray 415A propagation directions to achieve some collimation in the lateral direction and thus illumination regions 475A are provided with limited extent in the lateral direction. Such collimation can achieve partial illumination of the backlight in regions 475A that are determined by the location of the light source along the first input end 2.

Similarly light rays 417B propagating within the waveguide 1 are input with an expanding cone in the lateral direction. Some collimation is provided in the lateral direction and thus illumination regions 477B are provided with limited extent in the lateral direction. Such collimation can achieve partial illumination of the backlight in regions 477B that are determined by the location of the light source along the input end 4.

By control of light sources 15A, 15B and 17A, 17B, the directionality of output may be different for different regions of the backlight 20. In an illustrative example, in one mode of operations, the left side of the display may be arranged for high image visibility to the driver 47 and passenger 45 and the tight side of the display may be provided for high image security factor to the driver 47 with high image visibility to the passenger 45. In other illustrative modes of operation, the whole display may be arranged to be seen by both occupants or the whole display may be arranged to be private to the driver.

The number of light sources 15A-N may be adjusted to increase the number of addressable regions of display control.

It may be desirable to provide a centre stack display (CSD) for a vehicle or similar application.

Figure 21A:
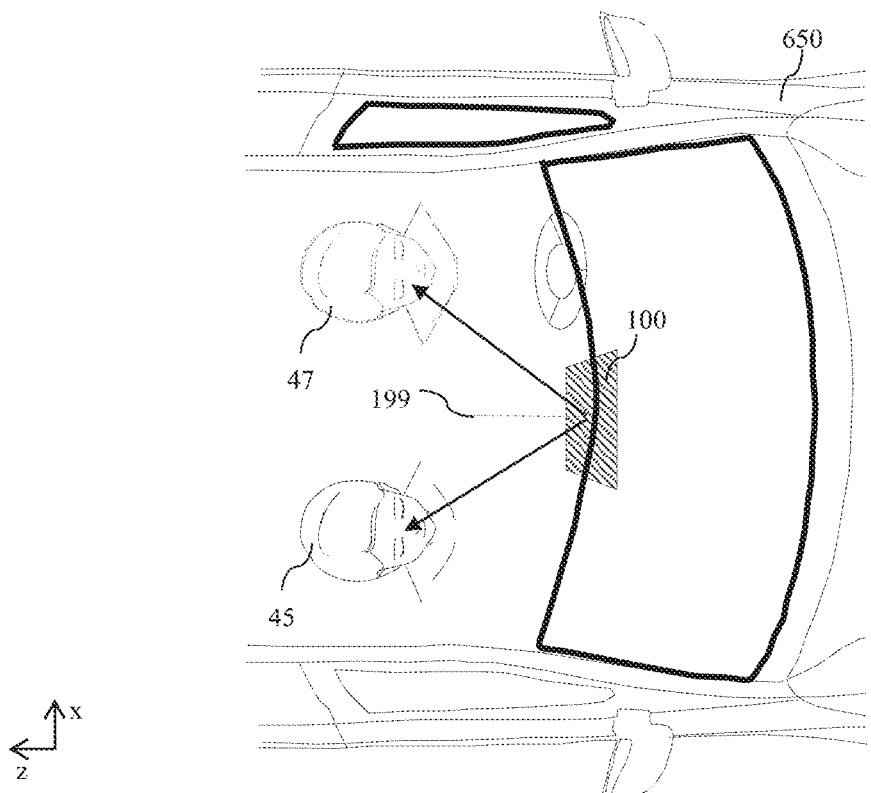
FIG. 21A is a schematic diagram illustrating a top view of a centre stack display in an automotive vehicle.

FIG. 21A is a schematic diagram illustrating a top view of a centre stack display 100 in an automotive vehicle 650. In comparison to the arrangement of FIG. 2, occupants 45, 47 are seated either side of the optical axis 199 of the display 100. Features of the embodiment of FIG. 21A not discussed in further detail may be assumed to correspond to the features with equivalent reference numerals as discussed above, including any potential variations in the features.

Figure 21B:
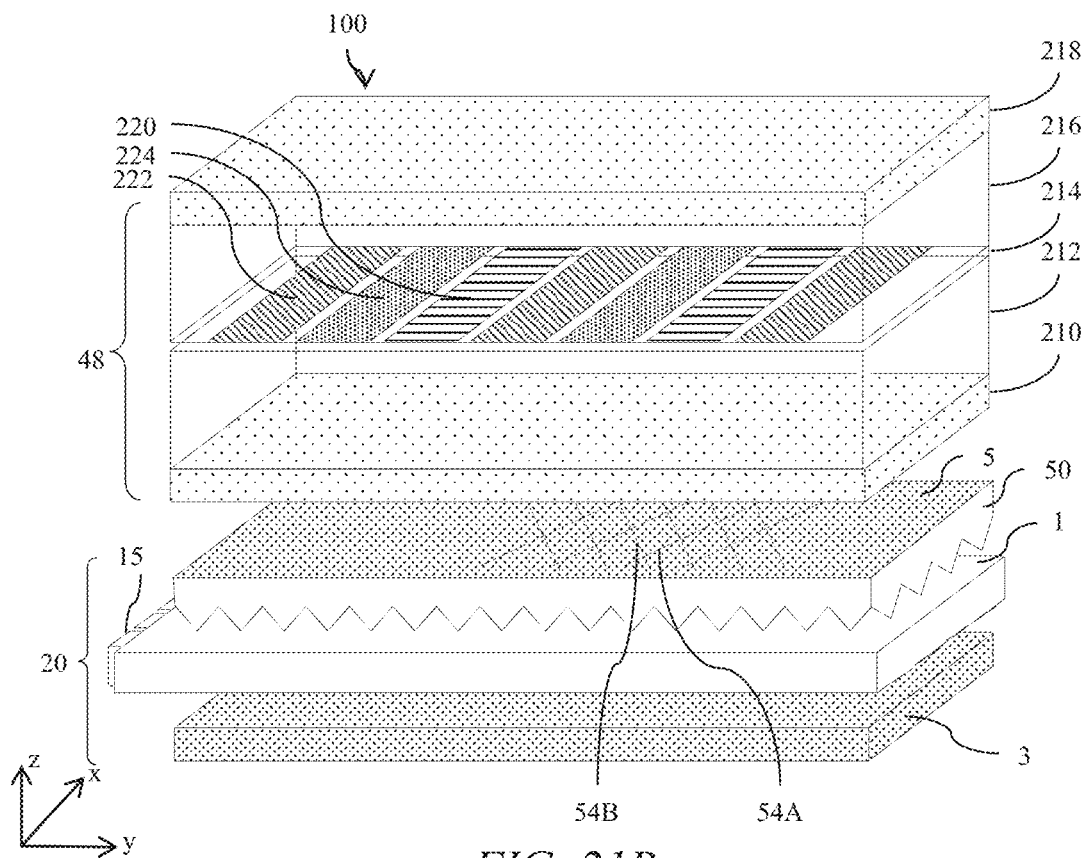
FIG. 21B is a schematic diagram illustrating a front perspective view of a dual lobe display.

FIG. 21B is a schematic diagram illustrating a front perspective view of a dual lobe display 100. In comparison FIG. 1A, the polar control retarder 300 and polarisers 302, 318 are omitted. Further, as alternatives to the present embodiments described hereinbefore, said retarder 300 and polarisers 302, 318 may more generally be omitted in order to advantageously achieve increased efficiency, although not to achieve image invisibility in typical ambient lighting and display luminance conditions.

Figure 21C:
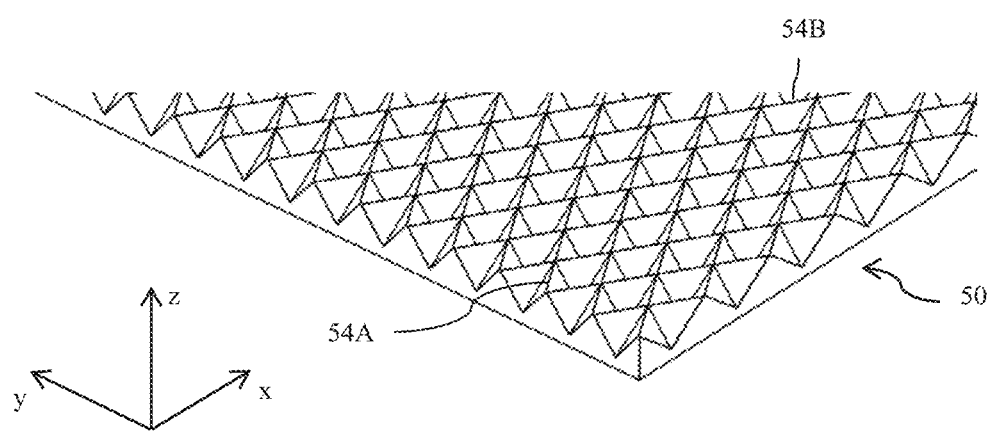
FIG. 21C is a schematic diagram illustrating a side perspective view of a turning film comprising first and second arrays of linear straight prismatic elements wherein the axes of the prismatic elements are each inclined to an axis along the edge of the display.
Figure 21D:
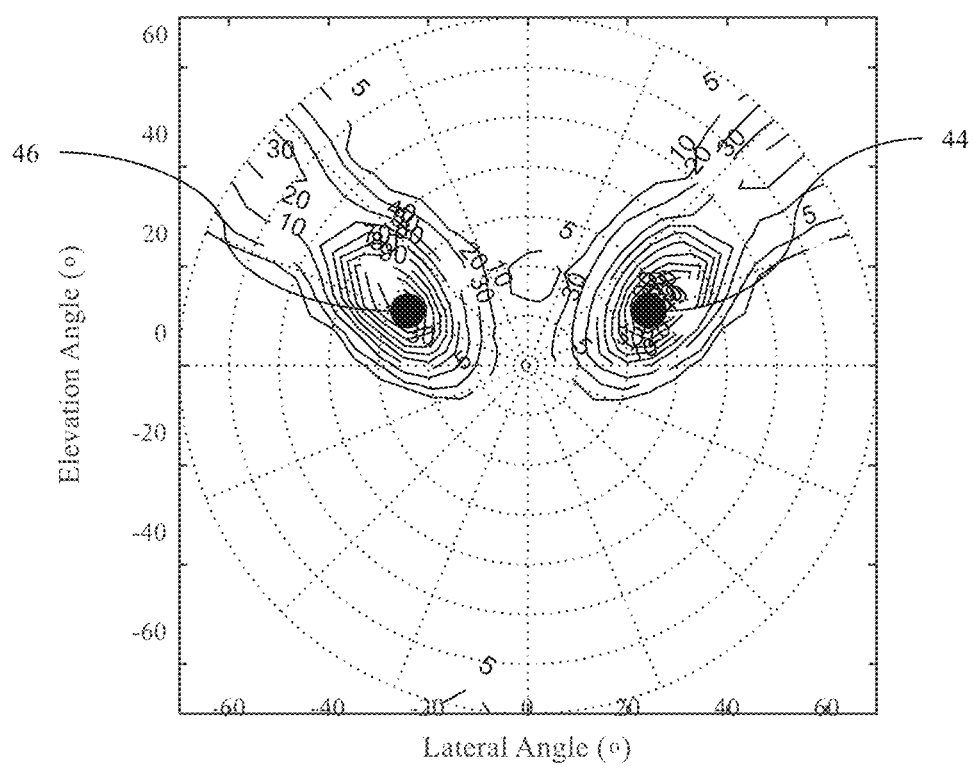
FIG. 21D is a schematic graph illustrating the polar and azimuthal variation of output luminance of the collimated waveguide of FIG. 3B and off-axis turning film of FIG. 21C for light input from light sources at the first input side for efficient mode of operation.

FIG. 21C is a schematic diagram illustrating a side perspective view of a turning film comprising first and second arrays of linear straight prismatic elements wherein the axes of the prismatic elements are each inclined to an axis along the edge of the display; and FIG. 21D is a schematic graph illustrating the polar and azimuthal variation of output luminance of the collimated waveguide of FIG. 3B and off-axis turning film of FIG. 21C for light input from light sources at the first input side for efficient mode of operation, with the turning film component 50 of TABLE 7. Features of the embodiment of FIGS. 21B-C not discussed in further detail may be assumed to correspond to the features with equivalent reference numerals as discussed above, including any potential variations in the features.

TABLE 7

| | |
|---|---|
| αA | 49.5° |
| βA | 54.3° |
| γA | +32.5° |
| αB | 49.5° |
| βB | 54.3° |
| γB | −32.5° |

FIG. 21D is a schematic graph illustrating the polar and azimuthal variation of output luminance of the collimated waveguide of FIG. 3B and off-axis turning film of FIG. 21C for light input from light sources at the first input side for wide angle mode of operation. Directions 44, 46 for the occupants may be offset both vertically and laterally. Advantageously efficiency of the display may be substantially increased in comparison to arrangements with wide optical outputs.

Operation of the switchable retarders of FIG. 1A and FIG. 1B will now be described.

Figure 22A:
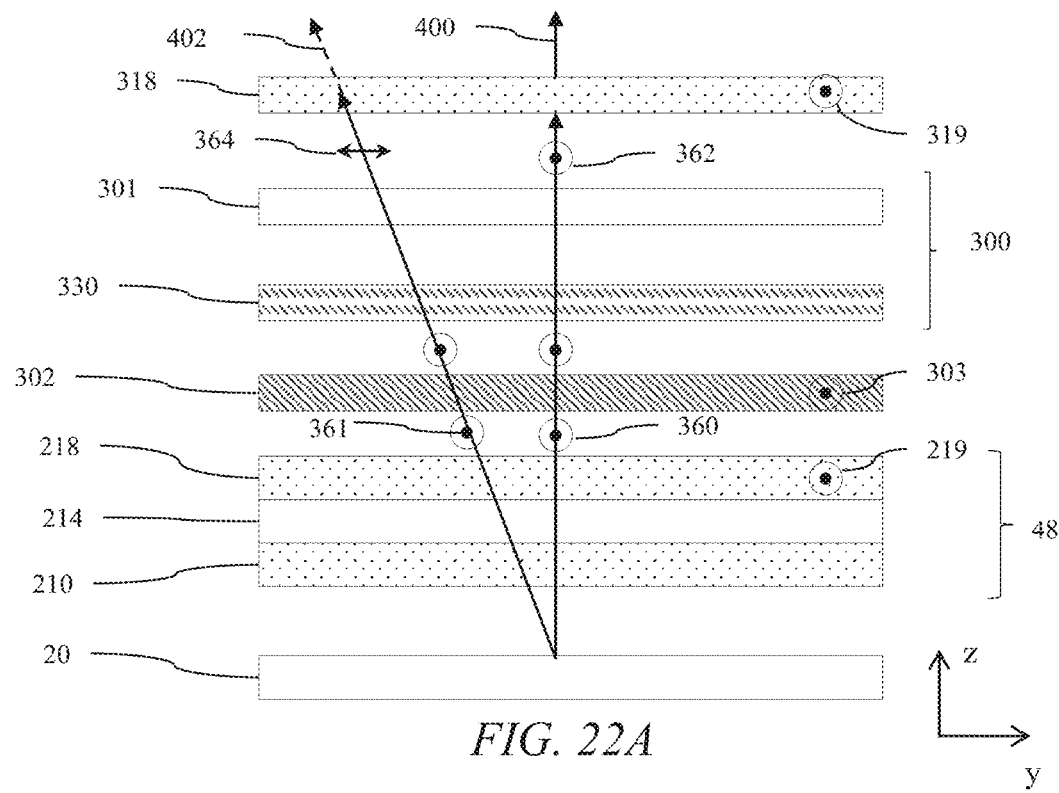
FIG. 22A is a schematic diagram illustrating in side view propagation of output light from a spatial light modulator through the optical stack of FIG. 1B in a privacy mode of operation.

FIG. 22A is a schematic diagram illustrating in side view propagation of output light from a spatial light modulator through the optical stack of FIG. 1A in a privacy mode of operation.

When the layer 314 of liquid crystal material 414 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 415 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

The polar distribution of light transmission illustrated in FIG. 8A modifies the polar distribution of luminance output of the underlying spatial light modulator 48. In the case that the spatial light modulator 48 comprises a directional backlight 20 then off-axis luminance may be further be reduced as described above.

Features of the embodiment of FIG. 22A not discussed in further detail may be assumed to correspond to the features with equivalent reference numerals as discussed above, including any potential variations in the features.

Advantageously, a privacy display is provided that has low luminance to an off-axis snooper while maintaining high luminance for an on-axis observer.

The operation of the reflective polariser 302 for light from ambient light source 604 will now be described for the display operating in privacy mode.

Figure 22B:
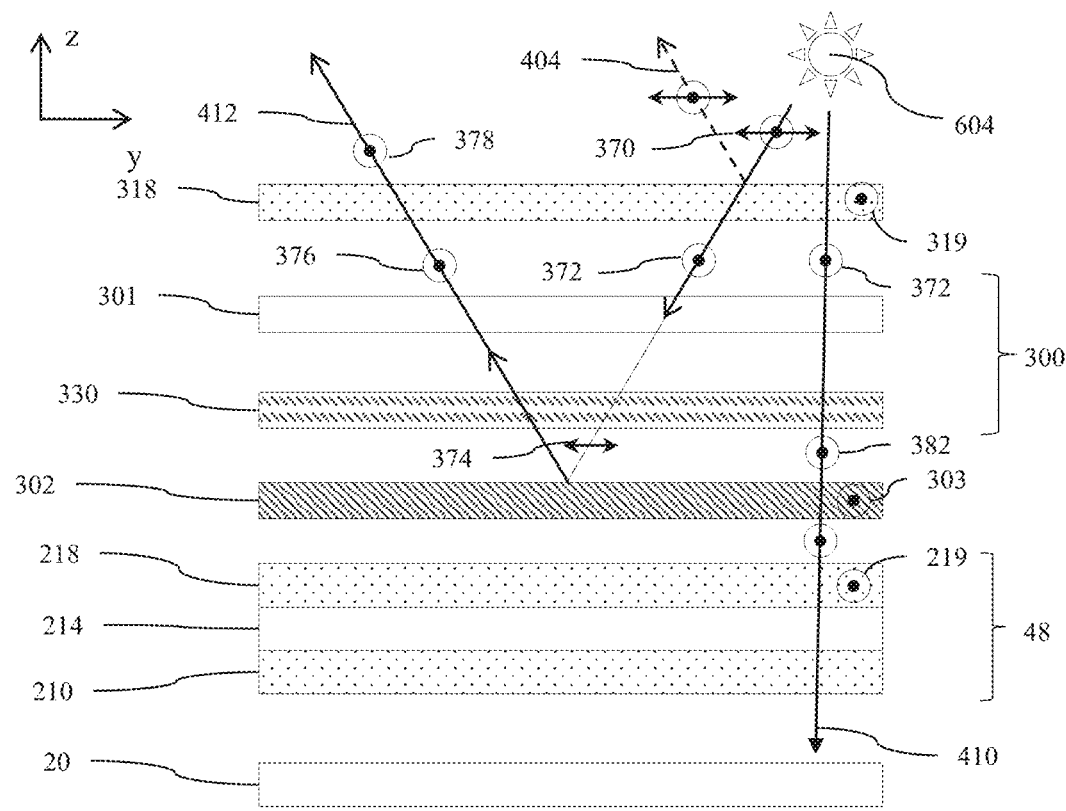
FIG. 22B is a schematic diagram illustrating in top view propagation of ambient illumination light through the optical stack of FIG. 1B in a privacy mode of operation.

FIG. 22B is a schematic diagram illustrating in top view propagation of ambient illumination light through the optical stack of FIG. 1A in a privacy mode of operation.

Ambient light source 604 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 8B thus illustrates that high reflectivity can be provided at typical snooper locations by means of the privacy state of the retarders 300. Thus; in the privacy mode of operation, the reflectivity for off-axis viewing positions is increased as illustrated in FIG. 8B, and the luminance for off-axis light from the spatial light modulator is reduced as illustrated in FIG. 8A.

In the public mode of operation, the control system 710, 752, 350 is arranged to switch the switchable liquid crystal retarder 301 into a second retarder state in which a phase shift is introduced to polarisation components of light passing therethrough along an axis inclined to a normal to the plane of the switchable liquid crystal retarder 301.

By way of comparison, solid angular extent 402D may be substantially the same as solid angular extent 402B in a public mode of operation. Such control of output solid angular extents 402C, 402D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a public mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 arranged to receive the output fight from the backlight; an input polariser 210 arranged on the input side of the spatial light modulator between the backlight 20 and the spatial light modulator 48; an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 318 in this case in which the additional polariser 318 is arranged on the output side of the output polariser 218; and a control system 710 arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Features of the embodiment of FIG. 22B not discussed in further detail may be assumed to correspond to the features with equivalent reference numerals as discussed above, including any potential variations in the features.

Advantageously, a privacy display is provided that has high reflectivity to an off-axis snooper while maintaining low reflectivity for an on-axis observer. As described above, such increased reflectivity provides enhanced privacy performance for the display in an ambiently illuminated environment.

Operation in the public mode will now be described.

Figure 23A:
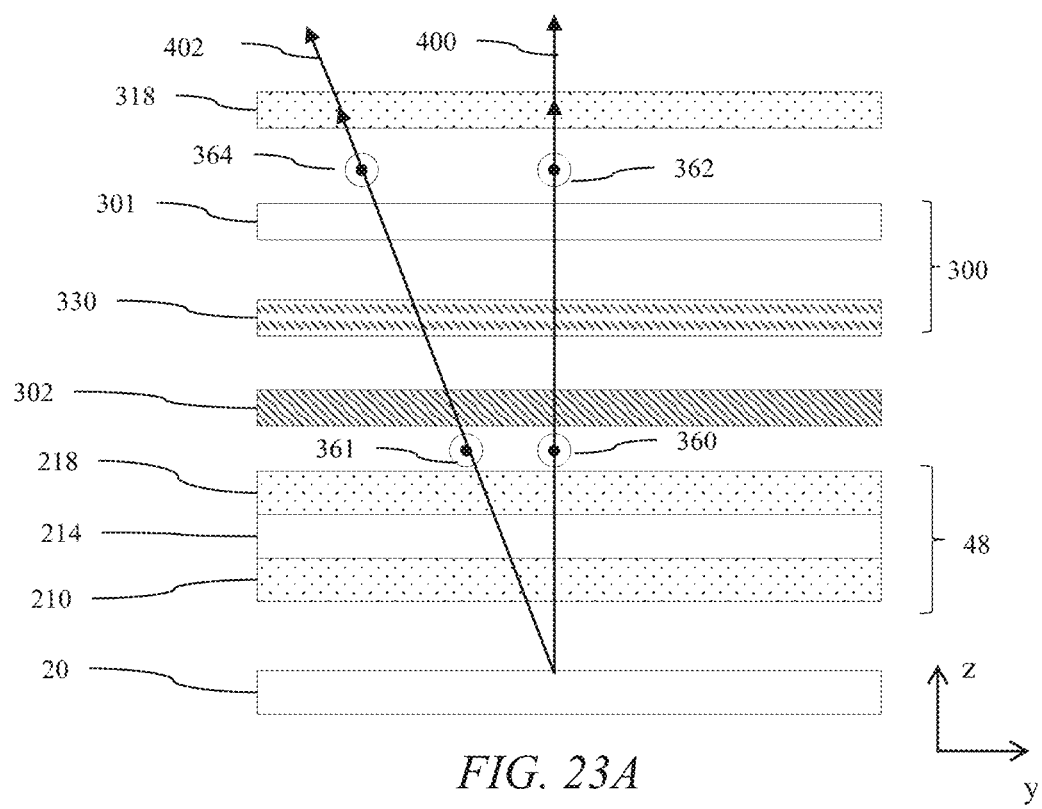
FIG. 23A is a schematic diagram illustrating in side view propagation of output light from a spatial light modulator through the optical stack of FIG. 1B in a public mode of operation.
Figure 23B:
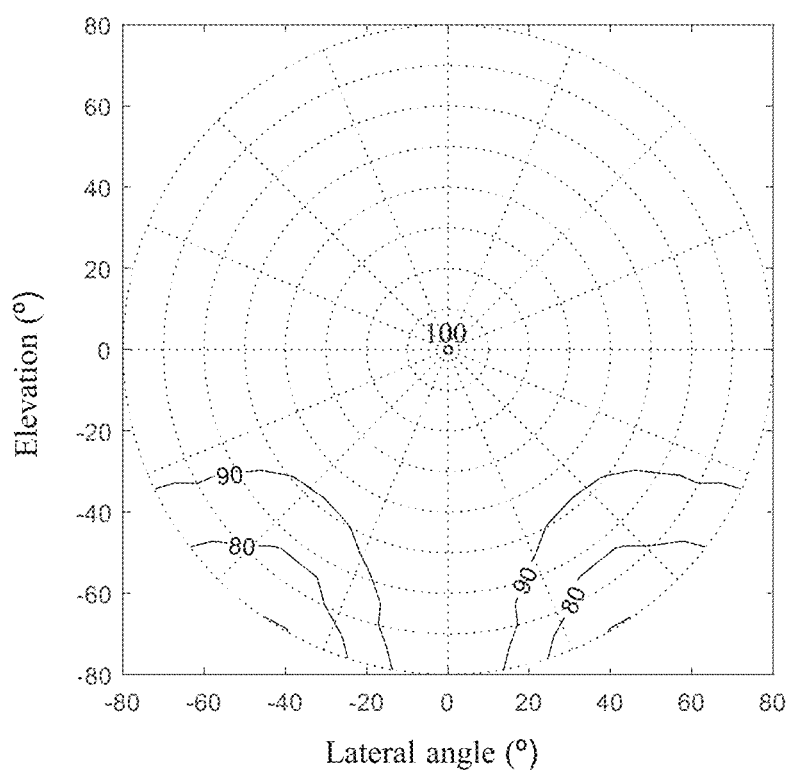
FIG. 23B is a schematic graph illustrating the variation of output luminance with polar direction for the transmitted light rays in FIG. 23A.

FIG. 23A is a schematic diagram illustrating in side view propagation of output light from a spatial light modulator through the optical stack of FIG. 1A in a public mode of operation; and FIG. 23B is a schematic graph illustrating the variation of output luminance with polar direction for the transmitted light rays in FIG. 23A.

Features of the embodiment of FIG. 23A and FIG. 23B not discussed in further detail may be assumed to correspond to the features with equivalent reference numerals as discussed above, including any potential variations in the features.

When the liquid crystal retarder 301 is in a first state of said two states, the retarders 300 provide no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 23B is substantially uniformly transmitting across a wide polar region. Advantageously a display may be switched to a wide field of view.

Figure 23C:
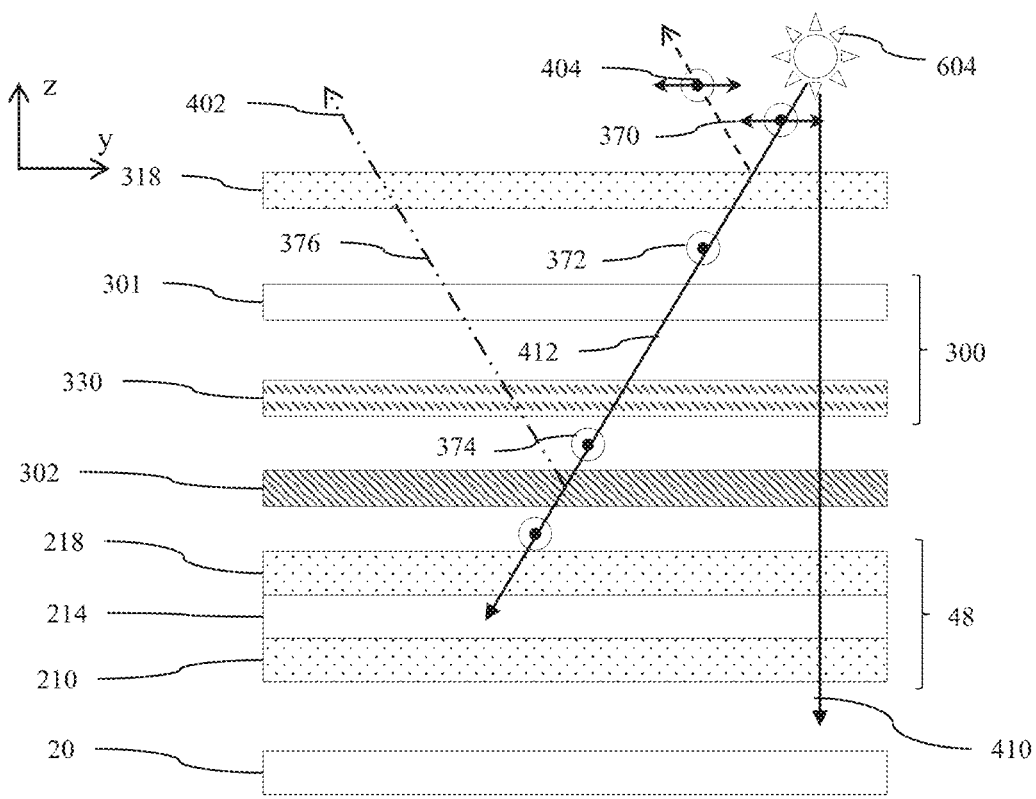
FIG. 23C is a schematic diagram illustrating in top view propagation of ambient illumination light through the optical stack of FIG. 1B in a public mode of operation.
Figure 23D:
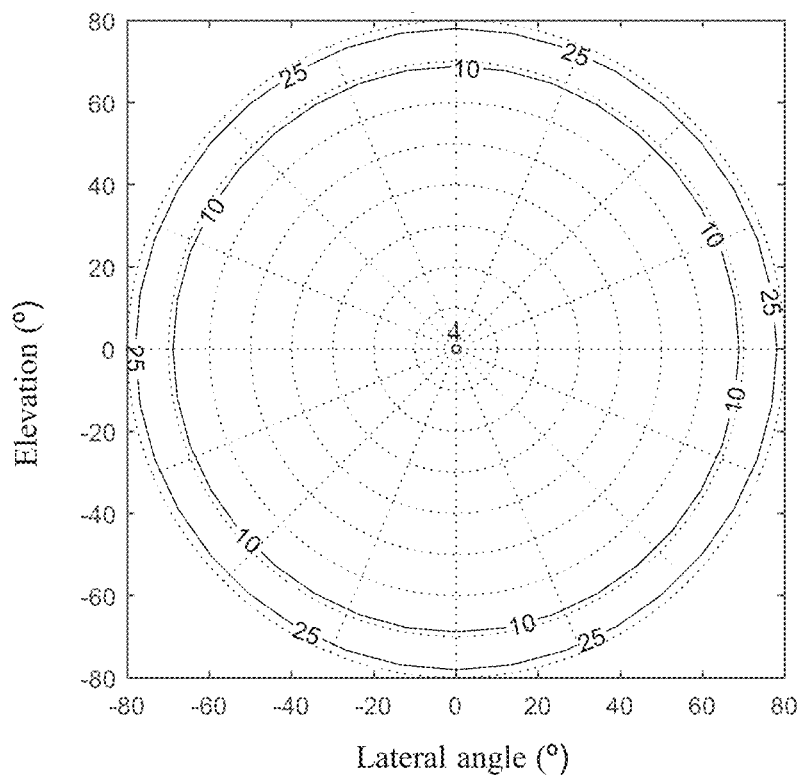
FIG. 23D is a schematic graph illustrating the variation of reflectivity with polar direction for the reflected light rays in FIG. 23C.

FIG. 23C is a schematic diagram illustrating in top view propagation of ambient illumination light through the optical stack of FIG. 1A in a public mode of operation; and FIG. 23D is a schematic graph illustrating the variation of reflectivity with polar direction for the reflected light rays in FIG. 23C.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1A.

Features of the embodiment of FIG. 23C and FIG. 23D not discussed in further detail may be assumed to correspond to the features with equivalent reference numerals as discussed above, including any potential variations in the features.

Advantageously in a public mode of operation, high luminance and low reflectivity is provided across a wide field of view. Such a display can be conveniently viewed with high contrast by multiple observers.

Other types of switchable privacy display will now be described.

A display device 100 that may be switched between privacy and public modes of operation comprises an imaging waveguide and an array of light sources as described in U.S. Pat. No. 9,519,153, which is incorporated by reference herein in its entirety. The imaging waveguide images an array of light sources to optical windows that may be controlled to provide high luminance on-axis and low luminance off-axis in a privacy mode, and high luminance with a large solid angle cone for public operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. An illumination apparatus comprising:
a waveguide extending across a plane and comprising:
first and second opposed light guiding surfaces arranged to guide light along the waveguide, the second light guiding surface being arranged to guide light by total internal reflection, and
an input end arranged between the first and second light guiding surfaces and extending in a lateral direction between the first and second light guiding surfaces;
at least one light source arranged to input light into the waveguide through the input end,
wherein the waveguide is arranged to cause light from the light sources to exit from the waveguide through the second light guiding surface by breaking total internal reflection; and
an optical turning film component comprising:
an input surface arranged to receive the light exiting from the waveguide, the input surface extending across the plane; and
an output surface facing the input surface,
wherein the input surface comprises:

a first array of prismatic elements each comprising a pair of facets defining a ridge therebetween, the ridges extending along a first array of lines across the plane in which the input surface extends; and a second array of prismatic elements each comprising a pair of facets defining a ridge therebetween, the ridges extending along a second array of lines across the plane in which the input surface extends, the first array of lines and the second array of lines extending at different angles projected on to the plane so that the first array of prismatic elements and the second array of prismatic elements deflect the light exiting from the waveguide into different lobes.

2. An illumination apparatus according to claim 1, wherein the first array of lines have a first arithmetic mean tangential angle projected on to the plane and the second array of lines have a second arithmetic mean tangential angle projected on to the plane, the second arithmetic mean tangential angle being greater than the first arithmetic mean tangential angle.

3. An illumination apparatus according to claim 1, wherein the first array of lines have an average tangential angle projected on to the plane of 0° from the lateral direction.

4. An illumination apparatus according to claim 1, wherein the first and second arrays of lines each have tangential angles projected on to the plane of not more than 55° from the lateral direction.

5. An illumination apparatus according to claim 1, wherein the optical turning film component has a rectangular shape across the plane and the lateral direction is along a major or minor axis of the rectangular shape.

6. An illumination apparatus according to claim 1, wherein the first array of lines are straight.

7. An illumination apparatus according to claim 1, wherein the first array of lines are curved.

8. An illumination apparatus according to claim 1, wherein the second array of lines are straight.

9. An illumination apparatus according to claim 1, wherein the second array of lines are curved.

10. An illumination apparatus according to claim 1, wherein facet angles of respective facets, defined between a normal to the facet and a normal to the plane, are between 40° and 70°, and preferably between 47.5° and 62.5°.

11. An illumination apparatus according to claim 1, wherein in at least one of the first and second arrays of prismatic elements, the facets on opposite sides of the ridge have facet angles, defined between a normal to the facet and a normal to the plane, that are different.

12. An illumination apparatus according to claim 1, wherein the output surface is planar.

13. An illumination apparatus according to claim 1, wherein the at least one light source comprises an array of light sources.

14. An illumination apparatus according to claim 1, wherein the waveguide further comprises a second input end arranged between the first and second light guiding surfaces opposite to the first mentioned input end, and the illumination apparatus further comprises at least one second light source arranged to input light into the waveguide through the second input end.

15. An illumination apparatus according to claim 14, further comprising a control system arranged to control the at least one first light source and the at least one second light source independently.

16. An illumination apparatus according to claim 14, wherein the waveguide is arranged to cause light from the at least one first light source and the at least one second light source to exit from the waveguide with different angular distributions.

17. An illumination apparatus according to claim 14, wherein the waveguide is arranged to cause light from the at least one first light source and the at least one second light source to exit from the waveguide with a common angular distribution.

18. An illumination apparatus according to claim 1, wherein the illumination apparatus comprises:

at least one first light source arranged to provide input light;

at least one second light source arranged to provide input light in an opposite direction from the at least one first light source;

a waveguide arrangement arranged to receive the input light from the at least one first light source and the at least one second light source and to cause light from the at least one first light source and the at least one second light source to exit from the waveguide arrangement by breaking total internal reflection, wherein the waveguide arrangement comprises at least one waveguide; and an optical turning film component comprising:

an input surface arranged to receive the light exiting from a waveguide through a light guiding surface of the waveguide by breaking total internal reflection, the input surface extending across the plane; and an output surface facing the input surface, wherein the input surface comprises:

a first array of prismatic elements each comprising a pair of facets defining a ridge therebetween, the ridges extending along a first array of lines across the plane in which the input surface extends; and a second array of prismatic elements each comprising a pair of facets defining a ridge therebetween, the ridges extending along a second array of lines across the plane in which the input surface extends, the first array of lines and the second array of lines extending at different angles projected on to the plane so that the first array of prismatic elements and the second array of prismatic elements deflect the light exiting from the waveguide into different lobes.

19. An illumination apparatus according to claim 18, wherein the waveguide arrangement comprises:

a waveguide extending across a plane and comprising:

first and second opposed light guiding surfaces arranged to guide light along the optical waveguide, the second light guiding surface being arranged to guide light by total internal reflection, and first and second input ends arranged between the first and second light guiding surfaces and extending in a lateral direction between the first and second light guiding surfaces;

wherein the at least one first light source is arranged to input light into the waveguide through the first input end and the at least one second light source is arranged to input light into the waveguide through the second input end, and the waveguide is arranged to cause light from the at least one first light source and the at least one second light source to exit from the waveguide through one of the first and second light guiding surfaces by breaking total internal reflection.

20. An illumination apparatus according to claim 18, wherein the waveguide arrangement comprises:

a first waveguide extending across a plane and comprising first and second opposed light guiding surfaces arranged to guide light along the optical waveguide, the second light guiding surface being arranged to guide light by total internal reflection; and a first input end arranged between the first and second light guiding surfaces and extending in a lateral direction between the first and second light guiding surfaces;

wherein the at least one first light source is arranged to input light into the first waveguide through the first input end, and the first waveguide is arranged to cause light from the at least one first light source to exit from the first waveguide through one of the first and second light guiding surface by breaking total internal reflection;

a second waveguide extending across the plane arranged in series with the first waveguide and comprising first and second opposed light guiding surfaces arranged to guide light along the optical waveguide, the second light guiding surface being arranged to guide light by total internal reflection, and a second input end arranged between the first and second light guiding surfaces and extending in a lateral direction between the first and second light guiding surfaces;

wherein the at least one second light source is arranged to input light into the second waveguide through the second input end, and the second waveguide is arranged to cause light from the at least one second light source to exit from the second waveguide through one of the first and second light guiding surfaces by breaking total internal reflection, and wherein the first and second waveguides are oriented so that at least one first light source and at least one second light source input light into the first and second waveguides in opposite directions.

21. A backlight apparatus comprising:
an illumination apparatus according to claim 1; and
a rear reflector arranged to receive light exiting from the first surface of waveguide and direct it back through the waveguide.

22. A display apparatus comprising:
a backlight apparatus according to claim 21; and
a spatial light modulator arranged to receive light from the backlight apparatus.

23. A display apparatus according to claim 22, further comprising:
at least one display polariser arranged on a side of the spatial light modulator;
an additional polariser arranged on the same side of the spatial light modulator as the display polariser; and
at least one polar control retarder arranged between the display polariser and the additional polariser, the at least one polar control retarder including a switchable liquid crystal retarder comprising a layer of liquid crystal material.

24. A vehicle having a display apparatus according to claim 23 mounted therein.

25. A vehicle according to claim 24, wherein the different lobes into which light exiting from the waveguide is deflected are lobes directed at locations of two occupants in the vehicle.

26. A vehicle according to claim 25, wherein the different lobes into which light exiting from the waveguide is deflected are lobes respectively directed at a location of an occupant in the vehicle and at a location of an internal surface of the vehicle.

27. An optical turning film component comprising:
an input surface for receiving light exiting from a waveguide through a light guiding surface of the waveguide by breaking total internal reflection, the input surface extending across a plane; and
an output surface facing the input surface,
wherein the input surface comprises:
a first array of prismatic elements each comprising a pair of facets defining a ridge therebetween, the ridges extending along a first array of lines across the plane; and
a second array of prismatic elements each comprising a pair of facets defining a ridge therebetween, the ridges extending along a second array of lines across the plane, the first array of lines and the second array of lines extending at different angles projected on to the plane so that the first array of prismatic elements and the second array of prismatic elements deflect the light exiting from the waveguide into different lobes.

28. An optical turning film component according to claim 27, wherein the first array of lines have a first arithmetic mean tangential angle projected on to the plane and second array of lines have a second arithmetic mean tangential angle projected on to the plane in which the input surface extends, the second arithmetic mean tangential angle being greater than the first arithmetic mean tangential angle.

29. An optical turning film component according to claim 27, wherein the first array of lines have an average tangential angle projected on to the plane of 0° from a lateral direction.

30. An optical turning film component according to claim 27, wherein the first and second arrays of lines have tangential angles projected on to the plane of not more than 55° from a lateral direction.

31. An optical turning film component according to claim 27, wherein the optical turning film component has a rectangular shape in the plane and the lateral direction is along a major or minor axis of the rectangular shape.

32. An optical turning film component according to claim 27, wherein the first array of lines are straight.

33. An optical turning film component according to claim 27, wherein the first array of lines are curved.

34. An optical turning film component according to claim 27, wherein the second array of lines are straight.

35. An optical turning film component according to claim 27, wherein the second array of lines are curved.

36. An optical turning film component according to claim 27, wherein facet angles of respective facets, defined between a normal to the facet and a normal to the plane, are between 40° and 70°, and preferably between 47.5° and 62.5°.

37. An optical turning film component according to claim 27, wherein in at least one of the first and second arrays of prismatic elements, the facets on opposite sides of the ridge have facet angles of respective facets, defined between a normal to the facet and a normal to the plane, that are different.

38. An optical turning film component according to claim 27, wherein the output surface is planar.

* * * * *